United States Patent
Iwasaki et al.

(10) Patent No.: US 9,740,060 B2
(45) Date of Patent: Aug. 22, 2017

(54) LIQUID CRYSTAL DISPLAY DEVICE

(71) Applicant: FUJIFILM Corporation, Tokyo (JP)

(72) Inventors: Tatsuya Iwasaki, Kanagawa (JP); Ayako Muramatsu, Kanagawa (JP); Hiroyuki Kaihoko, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 450 days.

(21) Appl. No.: 14/227,903

(22) Filed: Mar. 27, 2014

(65) Prior Publication Data

US 2014/0293198 A1    Oct. 2, 2014

(30) Foreign Application Priority Data

Mar. 29, 2013 (JP) ................. 2013-071287
Jun. 20, 2013 (JP) ................. 2013-129109
Jul. 1, 2013  (JP) ................. 2013-138434

(51) Int. Cl.
*G02F 1/1335* (2006.01)
*G02F 1/1343* (2006.01)
(Continued)

(52) U.S. Cl.
CPC .. *G02F 1/134363* (2013.01); *G02F 1/133632* (2013.01); *G02F 1/13363* (2013.01);
(Continued)

(58) Field of Classification Search
CPC ............. G02B 5/3083; G02F 1/133632; G02F 1/13363; G02F 1/133634; G02F 2413/10
See application file for complete search history.

(56) References Cited

U.S. PATENT DOCUMENTS 6,937,308 B2    8/2005   Ishikawa et al.
7,719,647 B2    5/2010   Kajita et al.
(Continued)

FOREIGN PATENT DOCUMENTS

JP   2002-055341 A    2/2002
JP   2004-094219 A    3/2004
(Continued)

OTHER PUBLICATIONS

Official Action, issued by the Japanese Patent Office on Mar. 1, 2016 in connection with corresponding Japanese Patent Application No. 2013-138434.
(Continued)

*Primary Examiner* — Wen-Ying P Chen
(74) *Attorney, Agent, or Firm* — Edwards Neils LLC; Jean C. Edwards, Esq.

(57) ABSTRACT

A liquid crystal display includes: a first polarizer; a liquid crystal cell including a liquid crystal layer containing liquid crystal molecules horizontally aligned to a face of a substrate; and a second polarizer. The liquid crystal display further includes a first optical compensation film disposed between the first polarizer and the liquid crystal cell, an absorption axis of the first polarizer, an optical axis of the first optical compensation film, and an optical axis of the liquid crystal layer being parallel to each other in a view of the liquid crystal cell in a direction orthogonal to the face of the substrate of the liquid crystal cell. The optical axis of the liquid crystal layer of the liquid crystal cell and the optical axis of the first optical compensation film have a tilt angle from the face of the substrate of the liquid crystal cell in a same direction.

26 Claims, 11 Drawing Sheets

(51) Int. Cl.
  *G02F 1/13363* (2006.01)
  *G02F 1/1337* (2006.01)
(52) U.S. Cl.
  CPC .. *G02F 1/133528* (2013.01); *G02F 1/133634* (2013.01); *G02F 2001/133738* (2013.01); *G02F 2413/10* (2013.01)

(56) References Cited

U.S. PATENT DOCUMENTS

| | | | |
|---|---|---|---|
| 8,654,287 | B2 | 2/2014 | Kaihoko et al. |
| 9,261,732 | B2 | 2/2016 | Kaihoko et al. |
| 2004/0017532 | A1* | 1/2004 | Ishikawa ........... G02F 1/133632 349/141 |
| 2005/0110933 | A1* | 5/2005 | Jeon ................. G02F 1/133634 349/141 |
| 2005/0200780 | A1* | 9/2005 | Ito ...................... C09K 19/3001 349/118 |
| 2006/0176424 | A1 | 8/2006 | Kajita et al. |
| 2007/0091228 | A1* | 4/2007 | Itadani .............. G02F 1/133528 349/96 |
| 2007/0146596 | A1 | 6/2007 | Fujii |
| 2010/0245725 | A1 | 9/2010 | Kaihoko et al. |
| 2011/0261298 | A1* | 10/2011 | Yoshihara .............. G02B 1/105 349/96 |
| 2014/0111745 | A1 | 4/2014 | Kaihoko et al. |
| 2014/0117570 | A1 | 5/2014 | Kaihoko et al. |
| 2014/0176887 | A1 | 6/2014 | Takeda et al. |

FOREIGN PATENT DOCUMENTS

| | | |
|---|---|---|
| JP | 2006-078718 A | 3/2006 |
| JP | 2006-220680 A | 8/2006 |
| JP | 2006-293108 A | 10/2006 |
| JP | 2007-178536 A | 7/2007 |
| JP | 2010-085639 A | 4/2010 |
| JP | 2010-102296 A | 5/2010 |
| JP | 2011-095401 | 5/2011 |
| JP | 2013-019943 A | 1/2013 |
| JP | 2013-050482 A | 3/2013 |

OTHER PUBLICATIONS

Notification of Reasons for Refusal issued by the Japanese Patent Office on Oct. 25, 2016, in connection with corresponding Japanese Patent Application No. 2013-138434.

* cited by examiner

LIQUID CRYSTAL DISPLAY DEVICE

The present application claims the benefit of priority from Japanese Patent Application No. 071287/2013, filed on Mar. 29, 2013, Japanese Patent Application No. 129109/2013, filed on Jun. 20, 2013, and Japanese Patent Application No. 138434/2013, filed on Jul. 1, 2013, the content of which are herein incorporated by reference in their entirety.

TECHNICAL FIELD

The present invention relates to an in-plane switching (IPS) liquid crystal display device.

BACKGROUND

Liquid crystal display devices driven by a transverse electric field have been drawing attention due to satisfactory viewing characteristics, for example, of an in-plane switching (IPS) mode and a fringe field switching (FFS) mode. An IPS liquid crystal display has a better view angle than a twisted nematic (TN) or vertical alignment (VA) liquid crystal display device, as is disclosed in Japanese Patent Application Laid-Open No. 2002-55341. Such an advantage is probably caused by a parallel alignment of liquid crystal molecules to the face of a liquid crystal cell substrate in an IPS or FFS liquid crystal cell. As is disclosed in Japanese Patent Application Laid-Open Nos. 2002-55341 and 2004-94219, however, liquid crystal molecules in an IPS liquid crystal cell are not perfectly parallel to the face of a liquid crystal cell substrate. In particular, the longitudinal axes of the liquid crystal molecules are aligned with a tilt angle to the substrate face in the thickness direction, near the face of the substrate. This tilt angle of the aligned liquid crystal molecules affects the viewing characteristics.

A birefringence film disclosed in Japanese Patent Application Laid-Open No. 2002-55341 is disposed between a liquid crystal cell substrate and a polarizing plate and has optical anisotropy of a sign opposite to that of the liquid crystal molecules. The birefringence film has an optical axis that tilts at the same angle in the same direction as the liquid crystal Molecules in the liquid crystal cell. This reduces light leak in an oblique direction. A positive birefringence material disclosed in Japanese Patent Application Laid-Open No. 2004-94219 reduces the light leak in an oblique direction.

SUMMARY OF THE INVENTION

Problems to be Solved by the Invention

Under such circumstances, the inventors have concluded, through a study, that the tilt angle between the liquid crystal molecules and the face of the liquid crystal cell substrate varies the tint of a black display mode in top and bottom view (in directions parallel to the optical axis of the liquid crystal cell) and inside view (in directions orthogonal to the optical axis of the liquid crystal cell) in the liquid crystal layer in an IPS or FFS. Specifically, the red color is affected in top view; the yellow color is affected in side view; and the blue color is affected in bottom view. An object of the present invention is to provide a liquid crystal display that reduces the asymmetry in the tint of a black display mode, depending on the viewing direction.

Means for Solving the Problems

Under such circumstances, the inventors, who have conducted a study, have found a solution to these issues. The solution is to dispose an optical compensation film that has positive birefringence between a polarizer and a liquid crystal cell where the optical axis of the liquid crystal layer and the optical axis of the optical compensation film have the same tilt angle from the face of the liquid crystal cell substrate.

Means for solving the problems described above are shown below in <1>, preferably <2> to <28>.

<1> A liquid crystal display comprising, in sequence: a first polarizer; a liquid crystal cell including a liquid crystal layer containing liquid crystal molecules horizontally aligned to a face of a substrate of the liquid crystal cell; and a second polarizer; the liquid crystal display further comprising a first optical compensation film disposed between the first polarizer and the liquid crystal cell or between the liquid crystal cell and the second polarizer, an absorption axis of the first polarizer, an optical axis of the first optical compensation film, and an optical axis of the liquid crystal layer of the liquid crystal cell being parallel to each other in a view of the liquid crystal cell in a direction orthogonal to the face of the substrate of the liquid crystal cell, the optical axis of the liquid crystal layer of the liquid crystal cell and the optical axis of the first optical compensation film having a tilt angle from the face of the substrate of the liquid crystal cell in a same direction, and the first optical compensation film having positive birefringence.

<2> A liquid crystal display comprising, in sequence: a first polarizer; a first optical compensation film; a liquid crystal cell including a liquid crystal layer containing liquid crystal molecules horizontally aligned to a face of a substrate of the liquid crystal cell; and a second polarizer, an absorption axis of the first polarizer, an optical axis of the first optical compensation film, and an optical axis of the liquid crystal layer of the liquid crystal cell being parallel to each other in view of the liquid crystal cell in a direction orthogonal to the face of the substrate of the liquid crystal cell, the optical axis of the liquid crystal layer of the liquid crystal cell and the optical axis of the first optical compensation film having a tilt angle from the face of the substrate of the liquid crystal cell in a same direction, and the first optical compensation film having positive birefringence.

<3> A liquid crystal display comprising, in sequence: a first polarizer; a liquid crystal cell including a liquid crystal layer containing liquid crystal molecules horizontally aligned to a face of a substrate of the liquid crystal cell; a first optical compensation film; and a second polarizer, an absorption axis of the first polarizer, an optical axis of the liquid crystal layer of the liquid crystal cell, and an optical axis of the first optical compensation film being parallel to each other in view of the liquid crystal cell in a direction orthogonal to the face of the substrate of the liquid crystal cell, the optical axis of the liquid crystal layer of the liquid crystal cell and the optical axis of the first optical compensation film having a tilt angle from the face of the substrate of the liquid crystal cell in a same direction, and the first optical compensation film having positive birefringence.

<4> The liquid crystal display according to any one of <1> to <3>, wherein the optical axis of the first optical compensation film has a tilt angle of 1 to 20 degrees relative to the face of the substrate of the liquid crystal cell by an angle.

<5> The liquid crystal display according to any one of <1> to <3>, wherein an in-plane retardation (nm) Re(550) at a wavelength of 550 nm of the first optical compensation film is in a range of 20 to 300 nm and an Nz value (Nz=Rth(550)/Re(550)+0.5) is in a range of 0.9 to 1.1, where Re(550) represents in-plane retardation (nm) at a wavelength of 550 nm, and Rth(550) represents retardation (nm) across the thickness at a wavelength of 550 nm.

<6> The liquid crystal display according to any one of <1> to <5>, further comprising: a protective film in the first polarizer at the side of the liquid crystal cell, and satisfying: −50 nm≤Re(550)≤50 nm; and 50 nm≤Rth(550)≤50 nm,
where Re(550) represents in-plane retardation (nm) at a wavelength of 550 nm, and Rth(550) represents retardation (nm) across the thickness at a wavelength of 550 nm.

<7> The liquid crystal display according to any one of <1> to <3>, further comprising: a second optical compensation film in the second polarizer at the side of the liquid crystal cell.

<8> The liquid crystal display according to <7>, wherein the second optical compensation film satisfies: 0 nm<|Re(550)|≤550 nm, where |Re(550)| represents an absolute value of the in-plane retardation at a wavelength of 550 nm.

<9> The liquid crystal display according to <8>, wherein the second optical compensation film satisfies: 150 nm≤Re(550)≤300 nm; and −100 nm≤Rth(550)≤100 nm, where Re(550) represents in-plane retardation (nm) at a wavelength of 550 nm, and Rth(550) represents retardation (nm) across the thickness at a wavelength of 550 nm.

<10> The liquid crystal display according to <8>, wherein the second optical compensation film comprises two layers.

<11> The liquid crystal display according to <10>, wherein, one layer in the second optical compensation film satisfies: −100 nm≤Re(550)≤100 nm; and −250 nm≤Rth(550)≤0 nm, and other one layer in the second optical compensation film satisfies: 0 nm≤Re(550)≤200 nm; and 0 nm≤Rth(550)≤200 nm, where Re(550) represents in-plane retardation (nm) at a wavelength of 550 nm, and Rth(550) represents retardation (nm) across the thickness at a wavelength of 550 nm.

<12> The liquid crystal display according to <10>, wherein, one layer in the second optical compensation film satisfies: −50 nm≤Re(550)≤50 nm; and −200 nm≤Rth(550)≤−100 nm, and other one layer in the second optical compensation film satisfies: 50 nm≤Re(550)≤150 nm; and 50 nm≤Rth(550)≤150 nm, where Re(550) represents in-plane retardation (nm) at a wavelength of 550 nm, and Rth(550) represents retardation (nm) across the thickness at a wavelength of 550 nm.

<13> The liquid crystal display according to <10>, wherein, one layer in the second optical compensation film satisfies: −100 nm≤Re(550)≤100 nm; and 0 nm≤Rth(550)≤250 nm, and other one layer of the second optical compensation film satisfies: 0 nm≤Re(550)≤200 nm; and −200 nm≤Rth(550)≤0 nm, where Re(550) represents in-plane retardation (nm) at a wavelength of 550 nm, and Rth(550) represents retardation (nm) across the thickness at a wavelength of 550 nm.

<14> The liquid crystal display according to <10>, wherein, one layer in the second optical compensation film satisfies: −50 nm≤Re(550)≤50 nm; and 50 nm≤Rth(550)≤200 nm, and other one layer of the second optical compensation film satisfies: 50 nm≤Re(550)≤150 nm; and −150 nm≤Rth(550)≤−50 nm, where Re(550) represents in-plane retardation (nm) at a wavelength of 550 nm, and Rth(550) represents retardation (nm) across the thickness at a wavelength of 550 nm.

<15> The liquid crystal display according to any one of <1> to <3>, wherein the first optical compensation film satisfies: Re(450)/Re(550)≤1.2; and Rth(450)/Rth(550)≤1.2, where Re(450) represents in-plane retardation (nm) at a wavelength of 450 nm, Re(550) represents in-plane retardation (nm) at a wavelength of 550 nm, Rth(450) represents retardation (nm) across the thickness at a wavelength of 450 nm, and Rth(550) represents retardation (nm) across the thickness at a wavelength of 550 nm.

<16> The liquid crystal display according to any one of <1> to <3>, wherein the first optical compensation film satisfies: Re(450)/Re(550)≤0.9; and Rth(450)/Rth(550)≤0.9 where Re(450) represents in-plane retardation (nm) at a wavelength of 450 nm, Re(550) represents in-plane retardation (nm) at a wavelength of 550 nm, Rth(450) represents retardation (nm) across the thickness at a wavelength of 450 nm, and Rth(550) represents retardation (nm) across the thickness at a wavelength of 550 nm.

<17> The liquid crystal display according to <7>, wherein at least one of the first optical compensation film and the second optical compensation film comprises a polymer film.

<18> The liquid crystal display according to <17>, wherein the polymer film is selected from a cellulose acylate film, acyclic olefin polymer film, or an acrylic polymer film.

<19> The liquid crystal display according to <17>, wherein the polymer film has a thickness in a range of 1 to 90 μm.

<20> The liquid crystal display according to <18>, wherein the acrylic polymer film contains at least one of a lactone cyclic unit, a maleic anhydride unit, and a glutaric anhydride unit.

<21> The liquid crystal display according to any one of <1> to <3>, wherein at least one of the first polarizer and the second polarizer is disposed between an optical compensation film and a polarizer protective film.

<22> The liquid crystal display according to <21>, wherein the polarizer protective film has a thickness in a range of 10 to 80 μm.

<23> The liquid crystal display according to <7>, wherein the first polarizer or the second polarizer has a thickness of 50 μm or less.

<24> The liquid crystal display according to <7>, wherein at least one of the first optical compensation film and the second optical compensation film comprises a film prepared by fixing the alignment state of the constituents of the liquid crystal.

<25> The liquid crystal display according to any one of <1> to <3>, wherein the first optical compensation film comprises a film prepared by fixing the alignment state of the liquid crystal composition.

<26> The liquid crystal display according to <24>, wherein at least one of the first optical compensation film and the second optical compensation film is adjacent to the first polarizer or the second polarizer at a side of the film prepared by fixing the alignment state of the liquid crystal composition.

<27> The liquid crystal display according to <24>, wherein the liquid crystal compositions shows smectic phase.

<28> The liquid crystal display according to any one of <1> to <3>, wherein the first optical compensation film comprises a structural birefringence layer disposed on a face of the first polarizer or the second polarizer.

Advantages of the Invention

The present invention provides a liquid crystal display device having reduced asymmetry in the tint of a black display in vertical view and horizontal view.

THE BEST EMBODIMENTS OF THE INVENTION

The present invention will be explained in detail below. As used herein, the numerical ranges expressed with "to" are used to mean the ranges including the values indicated before and after "to" as lower and upper limits.

The relationship between the optical axes in this specification includes errors allowable within the technical field of the present invention.

In the specification, the direction parallel to the optical axis of the liquid crystal cell of the liquid crystal display device may be referred to as the vertical direction, and the direction orthogonal to the optical axis of the liquid crystal cell may be referred to as the horizontal direction. These terms are used merely for convenience and do not always define the top and bottom of the actual liquid crystal display device.

Embodiments of the present invention will now be described in detail with reference to the accompanying drawings.

Figure 1:
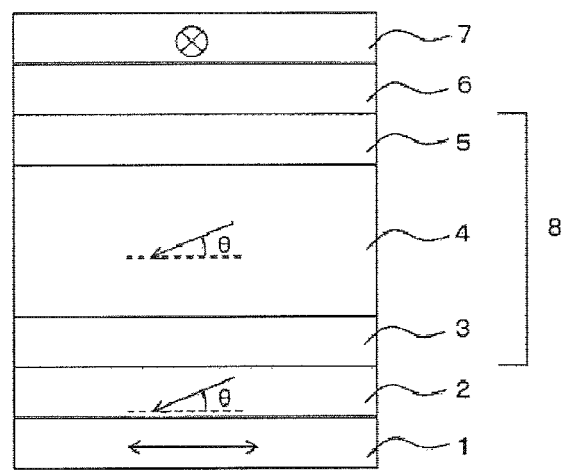
FIG. 1 is a conceptual diagram illustrating an exemplary liquid crystal display device according to the present invention.
Figure 3:
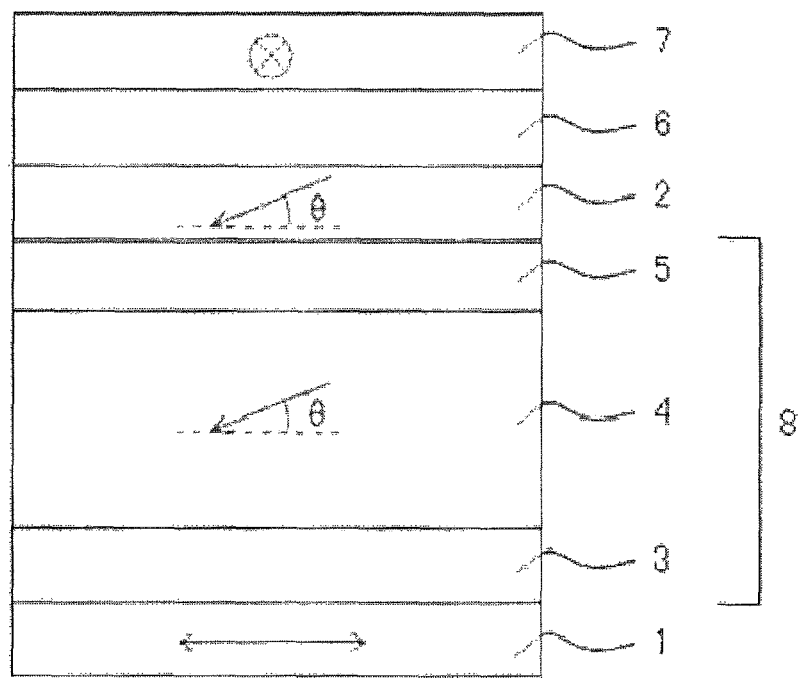
FIG. 3 is a conceptual diagram illustrating another exemplary liquid crystal display device according to the present invention.

FIG. 1 illustrates a liquid crystal display device according to a first embodiment of the present invention, and FIG. 3 illustrates a liquid crystal display device according to a second embodiment. The reference signs used in FIG. 1 are also used in the other drawings. The details of these embodiments will now be described.

A liquid crystal display device according to the present invention includes a first polarizer, a liquid crystal cell, and a second polarizer, arrayed in sequence. The liquid crystal cell has a liquid crystal layer containing liquid crystal molecules horizontally aligned to the face of the substrate. A first optical compensation film is disposed between the first polarizer and the liquid crystal cell or between the liquid crystal cell and the second polarizer. The absorption axis of the first polarizer, the optical axis of the first optical compensation film, and the optical axis of the liquid crystal layer in the liquid crystal cell are parallel to each other in a view orthogonal to the face of the liquid crystal cell substrate. The optical axis of the liquid crystal layer in the liquid crystal cell and the optical axis of the first optical compensation film have a tilt angle from the face of the liquid crystal cell substrate in a same direction. The first optical compensation film has positive birefringence.

(First Embodiment)

A liquid crystal display device according to a first embodiment of the present invention has a first optical compensation film disposed between a first polarizer and a liquid crystal cell. Specifically, the liquid crystal display device according to the first embodiment of the present invention includes a first polarizer, a first optical compensation film, a liquid crystal cell, and a second polarizer, arrayed in sequence. The liquid crystal cell has a liquid crystal layer containing liquid crystal molecules horizontally aligned to the substrate face. The absorption axis of the first polarizer, the optical axis of the first optical compensation film, and the optical axis of the liquid crystal layer in the liquid crystal cell are parallel to each other in a view orthogonal to the face of the liquid crystal cell substrate. The optical axis of the liquid crystal layer in the liquid crystal cell and the optical axis of the first optical compensation film have a tilt angle from the face of the liquid crystal cell substrate in a same direction. The first optical compensation film has positive birefringence.

FIG. 1 is a conceptual diagram illustrating an exemplary liquid crystal display device according to the present invention. In FIG. 1, the top is the front side, and the bottom is the rear side. FIG. 1, which is a conceptual diagram, does not necessarily represent accurate dimensions (this holds for the other drawings in the specification). FIG. 1 illustrates a first polarizer 1, a first optical compensation film 2, a lower substrate 3 of a liquid crystal cell 8, a liquid crystal layer 4, an upper substrate 5 of the liquid crystal cell 8, a second optical compensation film 6, and a second polarizer 7. The liquid crystal cell 8 includes at least the pair of substrates 3 and 5 and the liquid crystal layer 4 disposed therebetween.

In the liquid crystal display device according to the present invention, the first polarizer 1, the first optical compensation film 2, the liquid crystal cell 8 in an IPS mode, and the second polarizer 7 must be arrayed in sequence. The second optical compensation film 6 is optional.

In the present invention, the optical axis of the liquid crystal layer in the liquid crystal cell 8 (indicated by the arrow shown in the liquid crystal layer 4 in FIG. 1) and the optical axis of the first optical compensation film 2 (indicated by the arrow shown in the first optical compensation film 2 in FIG. 1) have a tilt angle (θ in FIG. 1) in the same direction from the face of the substrate 3 of the liquid crystal cell 8.

The tilt angle of a retardation layer is defined as the angle of the optical axis of the retardation layer from the interface of the retardation layer. The "same tilt angles" refer to tilt angles that are exactly the same angle or substantially the same angle including an error allowable within the scope of the present invention. Specifically, the difference of the tilt angles is preferably in the range of ±5 degrees or more preferably ±2 degrees.

FIG. 1 illustrates a liquid crystal cell in an IPS mode. Alternatively, the liquid crystal cell may in an FFS mode. If FIG. 1 illustrates a liquid crystal cell in an FFS mode, the top should preferably be the rear side, and the bottom be the front side.

Figure 2:
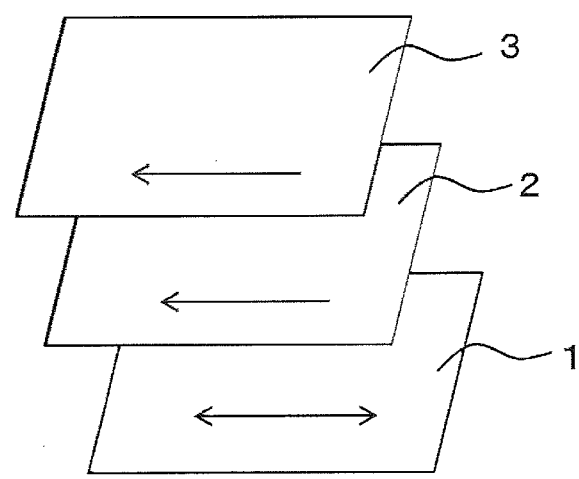
FIG. 2 is a conceptual diagram illustrating the relationship between the axes in a view orthogonal to the face of the lower substrate of the liquid crystal cell of the liquid crystal display device according to the present invention.

In the present invention, the absorption axis of the first polarizer 1 (indicated by the arrow shown in the first polarizer 1 in FIG. 1), the optical axis of the first optical compensation film 2 (indicated by the arrow shown in the first optical compensation film 2 in FIG. 1), and the optical axis of the liquid crystal layer 4 in the liquid crystal cell 8 (indicated by the arrow shown in the liquid crystal layer 4 in FIG. 1) are parallel to each other in a view orthogonal to the face of the lower substrate 3 of the liquid crystal cell 8 in an IPS mode. Specifically, the absorption axis of the first polarizer 1, the optical axis of the first optical compensation film 2, and the optical axis of the liquid crystal layer 4 are not actually parallel to each other, but appear to be parallel to each other in a view orthogonal to the face of the lower substrate 3 of the liquid crystal cell 8 in an IPS mode. FIG. 2 is a conceptual diagram illustrating the relationship between the axes in a view orthogonal to the face of the lower substrate 3 of the liquid crystal cell 8 in an IPS mode. The components that are the same as those in FIG. 1 are indicated by the same reference signs. As illustrated in FIG. 2, the absorption axis of the first polarizer 1, the optical axis of the first optical compensation film 2, and the optical axis of the liquid crystal layer 4 in the liquid crystal cell 8 appear to be parallel to each other in a view orthogonal to the face of the lower substrate 3.

The term "parallel" includes an error allowable within the scope of the present invention. Specifically, the difference from the parallel direction is preferably within the range of −10 degrees to +10 degrees, exclusive, more preferably −5 degrees to +5 degrees, exclusive, most preferably −3 degrees to +3 degrees, exclusive.

The technical advantages are described below in the parallelism among the absorption axis of the first polarizer 1, the optical axis of the first optical compensation film 2, and the optical axis of the liquid crystal layer 4 in the liquid crystal cell 8 in a view orthogonal to the face of the substrate 3 of the liquid crystal cell 8. The first optical compensation film 2 can compensate for a variation in the tint depending on the viewing angle caused by the tilt of the liquid crystal molecules driven in the liquid crystal cell by disposing the optical axis of the first optical compensation film 2 parallel to the optical axis of the liquid crystal layer 4 in the liquid crystal cell 8. The parallelism between the absorption axis of the first polarizer 1 and the optical axis of the first optical compensation film 2 achieves high productivity.

(Second Embodiment)

A liquid crystal display device according to a second embodiment of the present invention has a first optical compensation film disposed between a liquid crystal cell and a second optical compensation film. Specifically, the liquid crystal display device according to the second embodiment of the present invention includes a first polarizer, a liquid crystal cell, a first optical compensation film, and a second polarizer, arrayed in sequence. The liquid crystal cell has a liquid crystal layer containing liquid crystal molecules aligned parallel to the substrate face. The absorption axis of the first polarizer, the optical axis of the liquid crystal layer in the liquid crystal cell, and the optical axis of the first optical compensation film are parallel to each other in a view orthogonal to the face of the liquid crystal cell substrate. The optical axis of the liquid crystal layer in the liquid crystal cell and the optical axis of the first optical compensation film have the same tilt angle from the face of the liquid crystal cell substrate. The first optical compensation film has positive birefringence.

As illustrated in FIG. 3, the tint of the black display mode can also be improved by disposing the first optical compensation film on the opposite side of the liquid crystal cell, unlike the first embodiment. Specifically, the first polarizer 1, the liquid crystal cell 8 in an IPS mode, the first optical compensation film 2, and the second polarizer 7 are disposed in sequence. In this embodiment, the optical axis of the liquid crystal layer 4 in the liquid crystal cell 8 (indicated by the arrow shown in the liquid crystal layer 4 in FIG. 3) and the optical axis of the first optical compensation film 2 (indicated by the arrow shown in the first optical compensation film 2 in FIG. 3) have a tilt angle (θ in FIG. 3) in the same direction from the face of the substrate 3 of the liquid crystal cell 8. The absorption axis of the first polarizer 1, the optical axis of the first optical compensation film 2, and the optical axis of the liquid crystal layer 4 in the 8 are parallel to each other in a view orthogonal to the face of the lower substrate 3 of the liquid crystal cell 8.

Such a configuration provides a liquid crystal display device that reduces the asymmetry in the tint in the vertical and horizontal directions. As is disclosed in Japanese Patent Application Laid-Open No. 2002-55341, typically, the reduction in the asymmetry is expected to be caused by the disposition of the optical axis of a liquid crystal layer in a liquid crystal cell and the optical axis of a rear optical compensation film at tilt angles in opposite directions.

Figure 4:
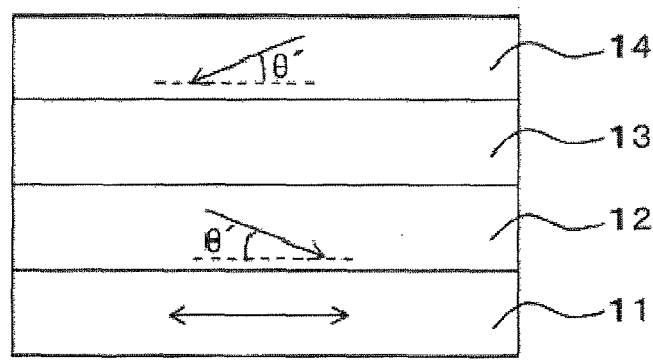
FIG. 4 is a conceptual diagram illustrating the presumed relationship between the axes before the conception of the present invention.

This prediction will now be described in detail. FIG. 4 is a conceptual diagram illustrating the presumed relationship between the axes before the conception of the present invention. FIG. 4 illustrates a rear polarizer 11, a rear optical compensation film 12, a rear liquid crystal cell substrate 13, and a liquid crystal layer 14. The optical axis of the rear liquid crystal layer 14 (indicated by the arrow in the liquid crystal layer 14 in FIG. 4) and the optical axis of the rear optical compensation film 12 (indicated by the arrow in the optical compensation film 12 in FIG. 4) have tilt angles (θ' in FIG. 4) in opposite directions from the face of the rear liquid crystal cell substrate 13. The optical compensation film 12 having such a tilt angle identical to that of the liquid crystal molecules was expected to provide appropriate optical compensate. The investigation by the inventors has revealed that a liquid crystal display having a tilt angle in the same direction can reduce the asymmetry in the tint in top and bottom views. The principle of this phenomenon will now be described.

A liquid crystal cell in an IPS mode driven by a transverse electric field has an optical axis tilting from the face of the liquid crystal cell substrate by approximately 1 to 3 degrees. Such a tilt angle causes faded black tint in side view. Specifically, the yellow tint is enhanced, which indicates light leak. The yellow tint is preferably shifted to blue or red tint in view of tint balance.

Figure 5:
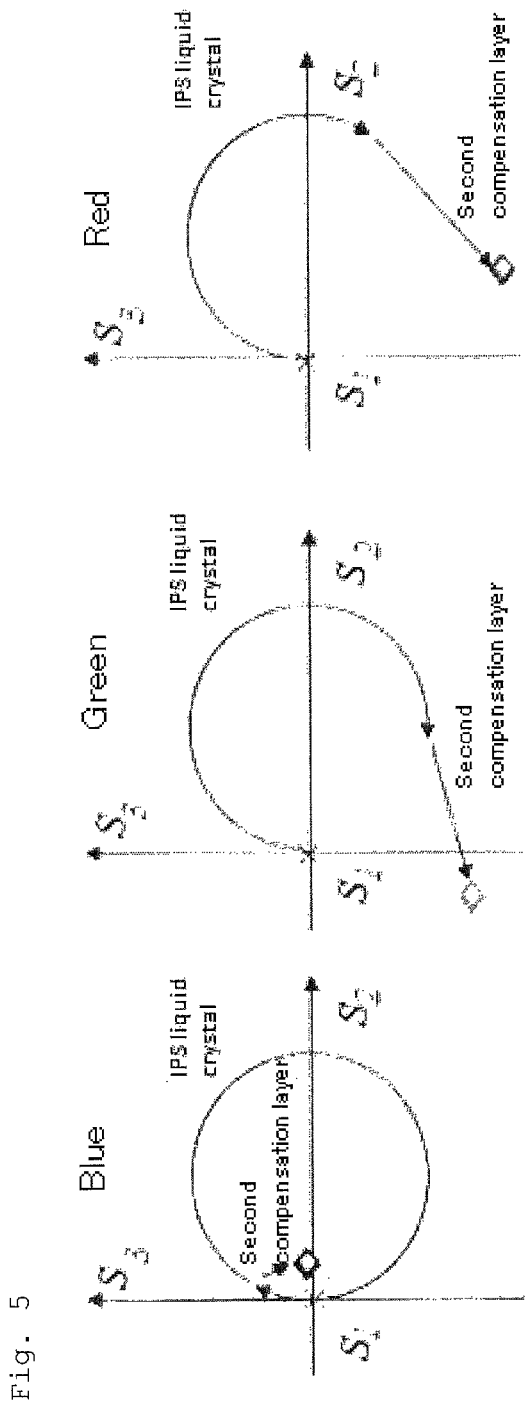
FIG. 5 is a conceptual diagram illustrating Poincare trajectories in side view not provided with a first optical compensation film.

More specifically, this can be described with reference to drawings illustrating Poincare trajectories indicating polarization states. FIG. 5 illustrates the Poincare trajectories in the transverse direction of a liquid crystal display device in FIG. 1 in an embodiment not provided with the first optical compensation film 2. For example, Comparative Example 1, which will be described below, corresponds to this embodiment. FIG. 5 illustrates the Poincare trajectories for blue, green, and red light, from the left of the drawing. The Poincare trajectory represents that as the final point (indicated by the rhombus in the drawing) approaches the extinction position (the origin indicated by the cross in the drawing), light leak decreases.

The liquid crystal display device illustrated in FIG. 5 has almost no leak of blue light. In contrast, the final points on green and red light largely deviate from the trajectories indicating light leak. As a result, the combination of green light and red light enhances the yellow tint in side view.

Figure 6:
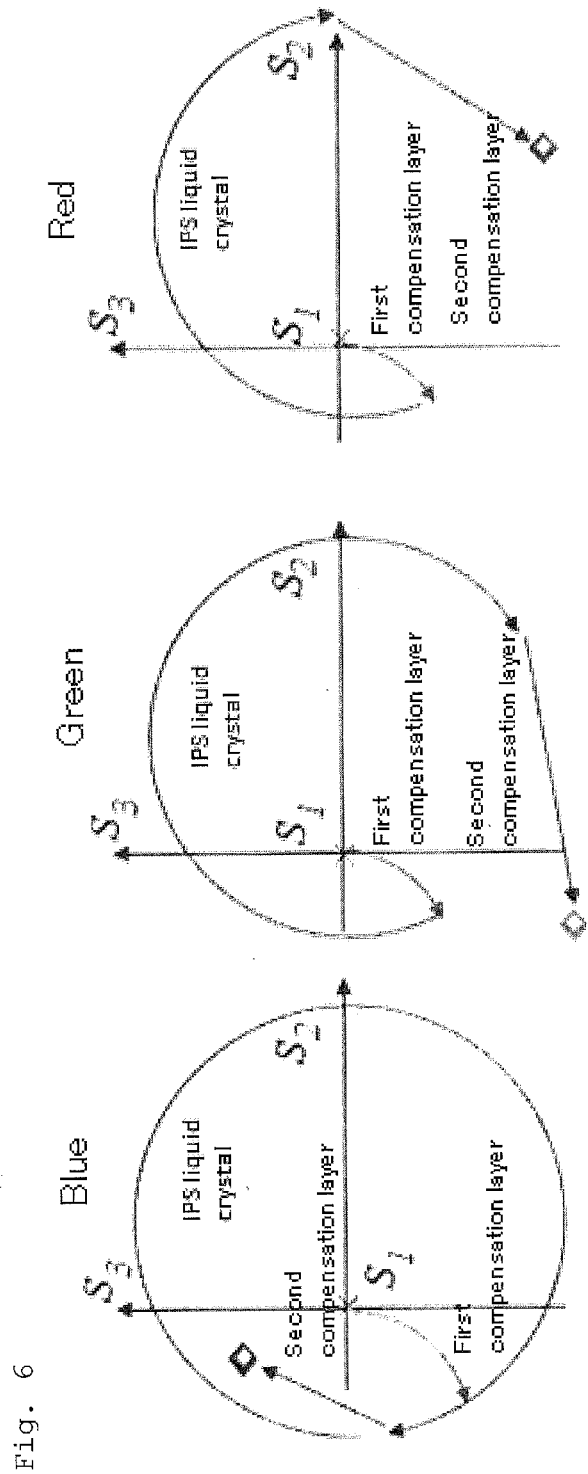
FIG. 6 is a conceptual diagram illustrating Poincare trajectories in side view of a liquid crystal display that includes a first optical compensation film having an optical axis tilting in a direction opposite to the optical axis of the liquid crystal cell.

FIG. 6 illustrates the Poincare trajectories in the transverse direction of the liquid crystal display deviate that includes a first optical compensation film having an optical axis tilting in a direction opposite to the optical axis of the liquid crystal cell. These trajectories corresponds to the embodiments shown in FIG. 4 and Comparative Example 3 described below. FIG. 6 illustrates the Poincare trajectories for blue, green, and red light, from the left of the drawing. Blue light does not deviate largely from the trajectory, whereas green and red light deviate largely from the trajectories. These results indicate that the yellow tint is enhanced in side view.

Figure 7:
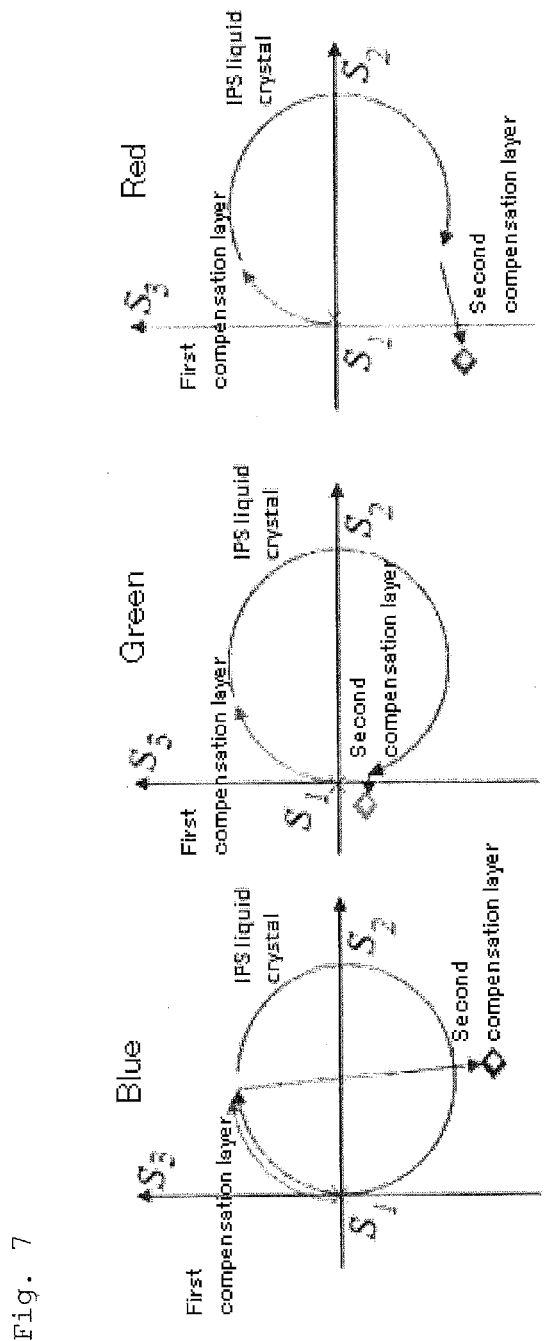
FIG. 7 is a conceptual diagram illustrating Poincare trajectories in side view of a liquid crystal display device according to the present invention.

FIG. 7 illustrates Poincare trajectories in side view of the liquid crystal display deviate according to the present invention (illustrated in FIG. 1). FIG. 7 illustrates the Poincare trajectories for blue, green, and red light, from the left of the drawing. In this embodiment, the first optical compensation film contributes to a reduction in leak of green light, but not leak of blue light and red light. In such a case, the combination of blue light and red light can shift the yellow tint toward purple.

Figure 8:
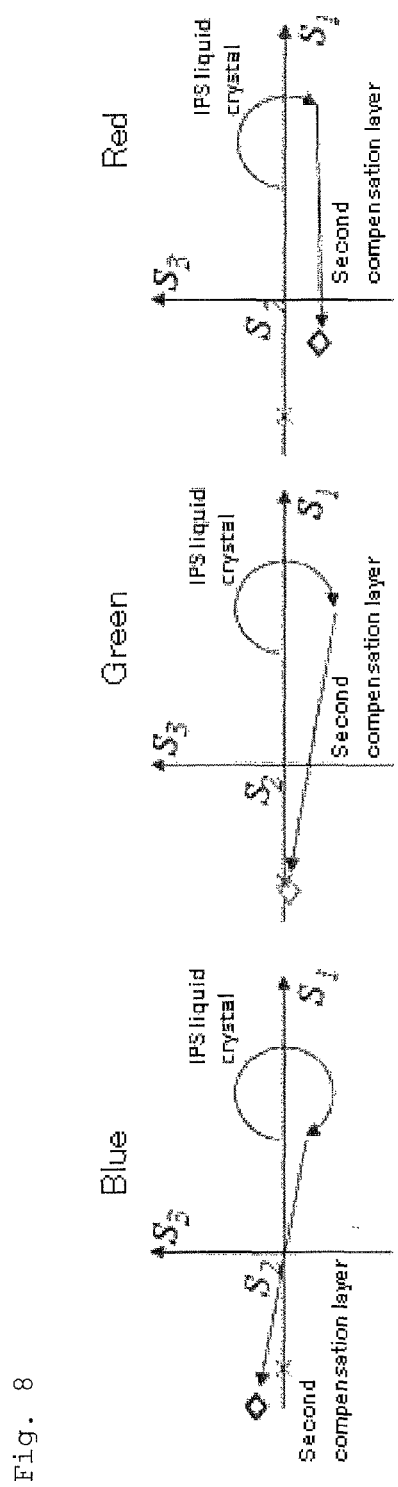
FIG. 8 is a conceptual diagram illustrating Poincare trajectories in top view of a liquid crystal display not provided with a first optical compensation film.
Figure 9:
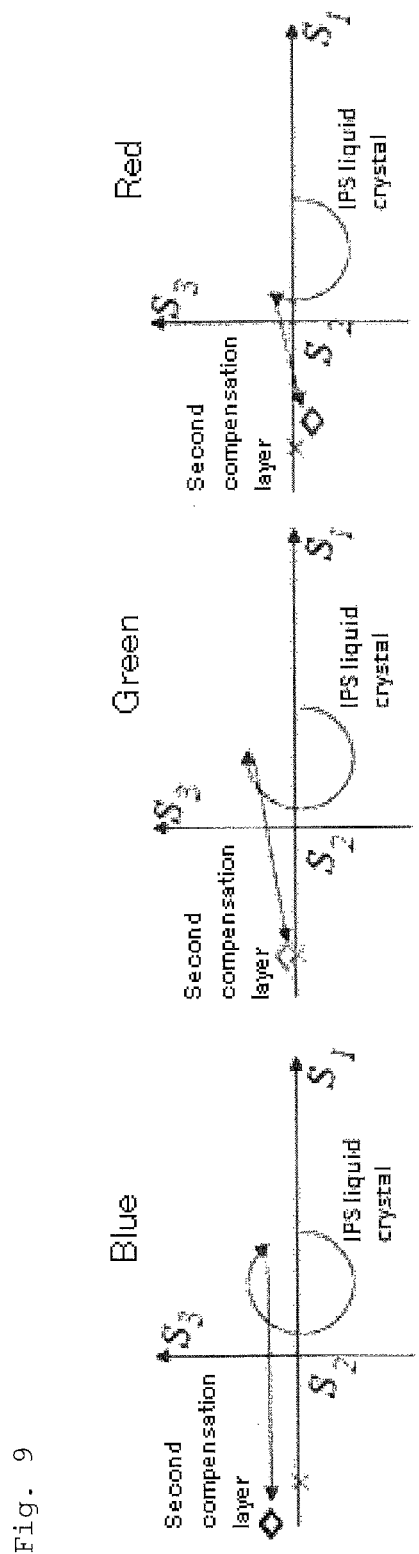
FIG. 9 is a conceptual diagram illustrating Poincare trajectories in bottom view of a liquid crystal display not provided with a first optical compensation film.

The tilt angle of the IPS liquid crystal causes an imbalance between the tints in top and bottom views. Specifically, the black display appears red in top view and blue in bottom view. This phenomenon can be explained through a comparison of the Poincare trajectories in top and bottom views. FIGS. 8 and 9 illustrate the Poincare trajectories in top and bottom views of a liquid crystal display deviate that is an embodiment shown in FIG. 1 but is not provided with the first optical compensation film 2. For example, Comparative Example 1, which will be described below, corresponds to this embodiment. FIGS. 8 and 9 illustrate the Poincare trajectories for blue, green, and red light, from the left of the drawing. The Poincare trajectory represents that as the final point (indicated by the rhombus in the drawing) approaches the extinction position (the origin indicated by the cross in the drawing), light leak decreases.

In comparison with FIGS. 8 and 9, the trajectories of IPS liquid crystal are vertically different to each other. This is because the IPS liquid crystal molecules are tilted and appear differently in top and bottom views. The rotational center of the Poincare trajectory of the IPS liquid crystal differs in top and bottom views. Such differences in the trajectories unbalance the extinction positions of blue, green and red light in top and bottom views. In particular, the extent of red light leak differs greatly in top and bottom views. As a result, the black display appears red in top view and blue in bottom view.

Figure 10:
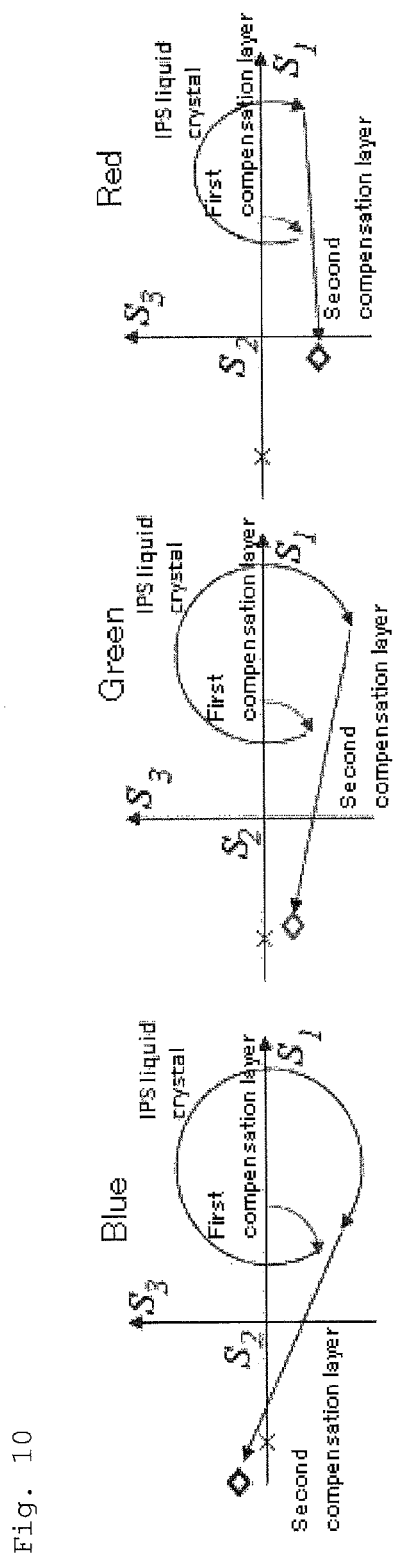
FIG. 10 is a conceptual diagram illustrating Poincare trajectories in top view of a liquid crystal display device that includes a first optical compensation film having an optical axis tilting in a direction opposite to that of the optical axis of the liquid crystal cell.
Figure 11:
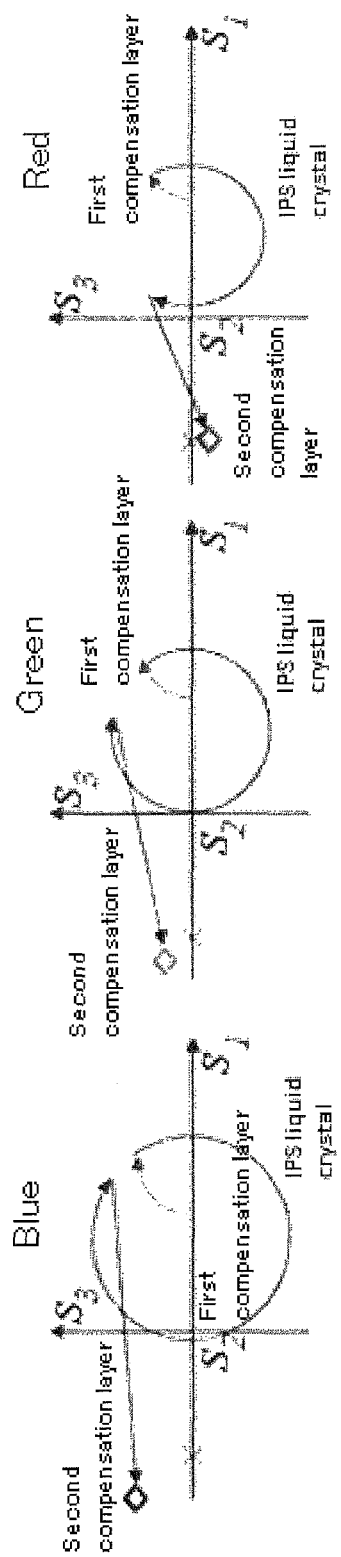
FIG. 11 is a conceptual diagram illustrating Poincare trajectories in bottom view of a liquid crystal display device that includes a first optical compensation film having an optical axis tilting in a direction opposite to that of the optical axis of the liquid crystal cell.

FIGS. 10 and 11 illustrate the Poincare trajectories in top and bottom views of a liquid crystal display that includes a first optical compensation film having an optical axis tilting in a direction opposite to that of the optical axis of the liquid crystal cell. This embodiment corresponds to FIG. 4 and Comparative Example 3 described below. In FIGS. 10 and 11, the extinction positions are unbalanced in top and bottom views; the black display appears red in top view and blue in bottom view.

Figure 12:
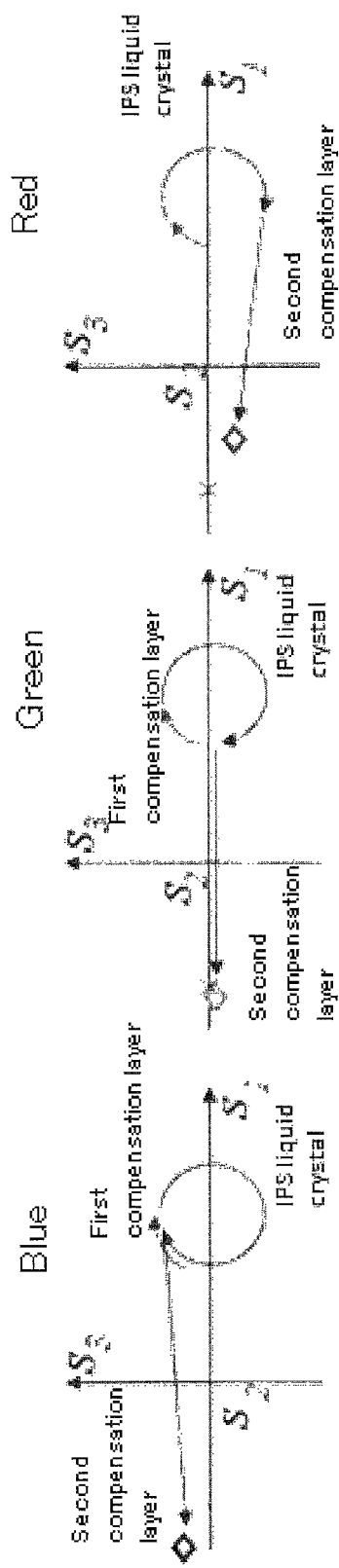
FIG. 12 is a conceptual diagram illustrating Poincare trajectories in top view of the liquid crystal display device according to the present invention.
Figure 13:
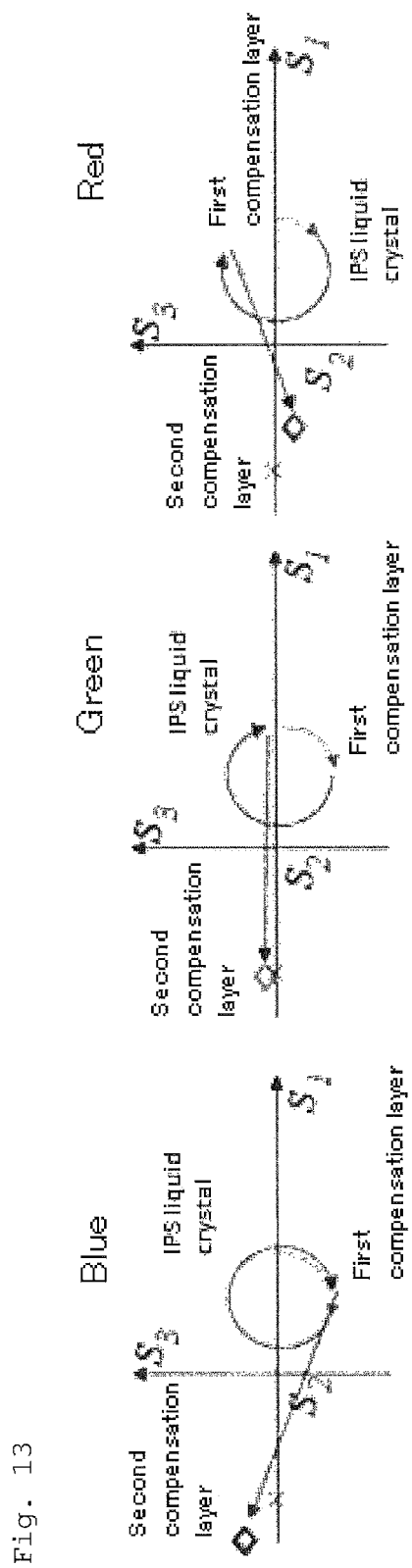
FIG. 13 is a conceptual diagram illustrating Poincare trajectories in bottom view of the liquid crystal display device according to the present invention.

FIGS. 12 and 13 illustrate Poincare trajectories in top and bottom views of the liquid crystal display device according to the first embodiment of the present invention (illustrated in FIG. 1). FIGS. 12 and 13 illustrate the Poincare trajectories for blue, green, and red light, from the left of the drawing. In this embodiment, the differences in the trajectories caused by the tilt angle of the IPS liquid crystal are reduced by the incorporation of a first optical compensation film, and the imbalance between the extinction positions in top and bottom views is reduced. Specifically, the rotational trajectories of the first optical compensation film are added to the corresponding rotational trajectories of the IPS liquid crystal to improve the symmetry in the trajectories in top and bottom views. As a result, the difference in tint between the top and bottom views is reduced and the tint of the black display mode is shifted toward purple, alleviating the asymmetricity in the black tint between the top and bottom views.

The liquid crystal display device according to the present invention has the following advantages.

The axis orthogonal to the face of the liquid crystal cell substrate is defined as 0 degrees, the axis disposed on the face of the substrate face as 90 degrees, and the viewing direction of the substrate as a polar angle:

(1) The standard deviation σ indicating the variation in the hue angle "hab" is 50 or less when the variation in the black tint at a polar angle of 60 degrees is plotted on the a*b* plane (in the CIE L*a*b* color coordinate system (CIELAB) (in 5-degree increment from 0 degrees to 360 degrees);

(2) The variation range Δu'v' is 0.1 or less when the variation in the black tint at a polar angle of 60 degrees is plotted on the u'v' plane (in the CIE1976 UCS chromaticity diagram) (in 5-degree increment from 0 degrees to 360 degrees); and (3) The average of the maximum values (luminance max) of the black brightness ($Cd/m^2$) in top view (5-degree increment from 0 to 180 degrees) and in bottom view (5-degree increment from 180 to 360 degrees) is 0.65 or less.

The liquid crystal display device according to the present invention may have any size, preferably small to medium sizes, for example, in the range of 1 to 15 inches. This is because the asymmetricity on the tint of a black display mode in top and bottom views, which is the problem solved by the present invention, is particularly noticeable in small to medium liquid crystal display devices. Although the asymmetricity on the tint is less observed in large liquid crystal display devices, the present invention can still be applied to the large displays to achieve the same advantages.

Details of the individual components according to the present invention will now be described.

<First Optical Compensation Film>

The first optical compensation film used in the present invention may be of any type having an optical axis parallel to the absorption axis of the first polarizer and the optical axis of the liquid crystal layer in the liquid crystal cell in a black display mode in a view orthogonal to the face of the liquid crystal cell substrate, where the optical axis of the first optical compensation film and the optical axis of the liquid crystal layer have a tilt angle from in the same direction from the face of the liquid crystal cell substrate; and the first optical compensation film has positive birefringence. The first optical compensation film may have a monolayer or multi-layer configuration. According to the present invention, the first optical compensation film preferably has a support and a retardation layer. If the first optical compensation film has a multi-layer configuration, at least one of the layers should have a tilt angle in the same direction as that of the liquid crystal layer of the liquid crystal cell.

The "optical axis" of the first optical compensation film refers to an axis that has the largest refractive index of the optical compensation film having positive birefringence. In other words, the optical axis of a uniaxial first optical compensation film is the rotational axis of the index ellipsoid, whereas the optical axis of a biaxial first optical compensation film is the slow axis.

The tilt angle of the optical axis is preferably uniform over the entire optical compensation film.

According to the present invention, an A plate (O plate) having a slight tilt angle is preferred as the first optical compensation film. A typical A plate satisfies the optical characteristics represented by nx>ny=nz. In the present invention, the A plate is defined as having an in-plane retardation Re(550) of in the range of approximately 20 to 300 nm and an Nz value (Nz=Rth(550)/Re(550)+0.5) in the range of approximately 0.9 to 1.1.

Specific examples of such optical compensation films according to the present invention includes a structural birefringence layer, such as a structure that contains liquid crystal compounds aligned with controlled tilt angles or an inorganic obliquely deposited inorganic film (disclosed in Japanese Patent Application Laid-Open No. 2007-178536); or an optically-anisotropic layer, such as a film composed of a polymer film that has been passed through rollers having different rim speeds to tilt the slow axis in the thickness direction (having a tilt angle) (disclosed in Japanese Patent Application Laid-Open No. 2010-58495). Such specific examples are included in the scope of the present invention.

A preferred form of the first optical compensation film is a laminate that contains liquid crystal compounds aligned with a controlled tilt angle and fixed on a support composed of a polymer film, from the view point of manufacturing adaptability.

The tilt angle of the liquid crystal compounds can be controlled by preliminarily tilting a rubbed alignment film and by controlling the polar angle from the support or from an air interface through the addition of a tilt-angle controlling agent to the liquid crystal layer. It is preferred that both methods are used in combination.

The tilt-angle controlling agent is composed of, for example, a copolymer of a monomer containing a fluoroaliphatic group preferably with an condensed aromatic functional group or with a monomer containing a carboxyl, sulfo, phosphono, or a salt thereof. The use of two or more tilt-angle controlling agents enables fine and stable control of the tilt angle. Such tilt-angle controlling agents are disclosed in paragraphs 0022-0063 of Japanese Patent Application Laid-Open No. 2008-257205 and paragraphs 0017-0124 of Japanese Patent Application Laid-Open No. 2006-91732.

In general, liquid crystal compounds can be categorized into a rod type and a disk type. The liquid crystal compounds in each category can be further classified into a low molecular type and a high molecular type. High-molecular compounds generally have a degree of polymerization of 100 or higher ("*koubunshi butsuri souten-i dainamikusu* (Polymer Physics, Dynamics of Phase transition)" Masao Doi, p. 2, Iwanami Shoten, 1992). According to the present invention, liquid crystal compounds of any type may be used, and rod-like or discotic liquid crystal compounds are preferred. Rod-like and discotic liquid crystal compounds that contain reactive groups are preferred because of their small dependency of temperature and humidity. Liquid crystal compounds composed of liquid crystal molecules that each has at least two reactive groups are more preferred. The liquid crystal may be a mixture of two or more different liquid crystal compounds. In such a case, at least one of the liquid crystal compounds preferably contains molecules having at least two reactive groups.

The liquid crystal according to the present invention may be a mixture of two or more different rod-like liquid crystal compounds, a mixture of two or more different discotic liquid crystal compounds, or a mixture of rod-like and discotic liquid crystal compounds.

A preferred polymer film is selected from a cellulose acylate film, a cyclic olefin polymer film, or an acrylic polymer film. A preferred acrylic polymer film contains at least one of a lactone cyclic unit, a maleic anhydride unit, and a glutaric anhydride unit.

The liquid crystal compound may be any known rod-like or discotic liquid crystal compound and preferably has polymerizable groups to fix the alignment state. The liquid crystal compound may have a laminated structure including the polymer film mentioned above as a support.

A single film composed of a composition containing liquid crystal compounds having polymerizable groups may be used as a first optical compensation film through peeling or through direct application of the liquid crystal compound on a polarizer serving as a support.

The thickness of the polymer film is preferably in the range of 1 to 90 μm, more preferably 1 to 70 μm, most preferably 1 to 50 μm.

The optical axis of the first optical compensation film preferably has a tilt angle from the face of the liquid crystal cell substrate in the range of 1 to 20 degrees, more preferably 1 to 10 degrees.

The first optical compensation film preferably satisfies the following relations:

$20\ nm \leq Re(550) \leq 300\ nm;$ and $10\ nm \leq Rth(550) \leq 150\ nm,$ where Re(550) represents in-plane retardation (nm) at a wavelength of 550 nm, and Rth(550) represents retardation (nm) across the thickness at a wavelength of 550 nm.

The first optical compensation film more preferably satisfies the following relations:

$20\ nm \leq Re(550) \leq 100\ nm;$ and $10\ nm \leq Rth(550) \leq 50\ nm.$

The wavelength dispersion of the in-plane retardation of the first optical compensation film is represented by Re(450)/Re(550), and the wavelength dispersion of the retardation across the thickness is represented by Rth(450)/Rth(550). Such small values on the wavelength dispersion contribute to effective compensation. Specifically, the first optical compensation film preferably satisfies the following relations:

$$Re(450)/Re(550) \leq 1.2;$$

$$Rth(450)/Rth(550) \leq 1.2,$$

where Re(450) represents in-plane retardation (nm) at a wavelength of 450 nm, and Rth(450) represents retardation (nm) across the thickness at a wavelength of 450 nm.

The first optical compensation film more preferably satisfies the following relations:

$$Re(450)/Re(550) \leq 1.0;$$

and $$Rth(450)/Rth(550) \leq 1.0.$$

The first optical compensation film most preferably satisfies the following relations:

$$Re(450)/Re(550) \leq 0.9;$$

and $$Rth(450)/Rth(550) \leq 0.9.$$

A known additive, such as a plasticizer, may be appropriately added to the polymer film or composition containing liquid crystal compounds that form the first optical compensation film. Examples of such additives are described in paragraphs 0138-0188 of Japanese Patent Application Laid-Open No. 2013-047794.

Examples of means for decreasing the values of Re(450)/Re(550) and Rth(450)/Rth(550) are disclosed in Japanese Patent Application Laid-Open Nos. 2010-84032 and 2010-031223, Japanese Translation of PCT International Application Laid-Open No. 2012-500234, and WO2013/018526.

To prevent a decrease in the front contrast due to the first optical compensation film, the film contrast value, which is represented by the following expression (1), is preferably 3000 or more, more preferably 7000 and more.

[film contrast value]=[maximum luminance of the optical compensation film disposed between two polarizing plates in a parallel Nicol state]/ [minimum luminance of the optical compensation film disposed between two polarizing plates in a cross Nicol state]     Expression (1):

If the first optical compensation film used is a film having a fixed alignment of liquid crystal compounds, the half-width of the orientation distribution in a microregion is preferably 1 degree or less, more preferably 0.3 degree or less to achieve the film contrast value described above.

Such a high degree of alignment order is achieved through the selection of alignment films and alignment aids, and the selection of liquid crystal compounds. For example, a high degree of alignment order can be achieved through the selection of a liquid crystal compound containing liquid crystal molecules in a smectic phase. For specific examples, refer to paragraphs 0040-0100 of Japanese Patent Application Laid-Open No. 2008-50553. Such a high degree of alignment order is preferably achieved through the use of a liquid crystal compound described in paragraphs 0020-0039 of Japanese Patent Application Laid-Open No. 2008-50553. Such a liquid crystal compound is included in the scope of the present invention.

If the first optical compensation film used is a film having a fixed alignment of liquid crystal compounds, the first optical compensation film preferably adjoins the polarizer.

<Second Optical Compensation Film>

In a preferred embodiment of the present invention, a second optical compensation film is disposed between a second polarizer and a liquid crystal cell, for example, of an IPS mode driven by a transverse electrical field. The second optical compensation film improves the contrast in an oblique direction. The second optical compensation film can be any known optical compensation film that provides compensation for liquid crystal driven by a transverse electric field, preferably a film having some retardation of $\lambda/2$ plate, where $\lambda$ represents wavelength, which is 550 nm in the present invention. A film having some retardation of a $\lambda/2$ plate has a retardation of preferably $\lambda/2\pm30\%$, more preferably $\lambda/2\pm15\%$. The second optical compensation film may be composed of any film that has a function as a $\lambda/2$ plate and may have a monolayer or multi-layer configuration. The in-plane retardation of the entire second optical compensation film preferably satisfies the following relation:

$$0 \text{ nm} < |Re(550)| \leq 550 \text{ nm},$$

where |Re(550)| represents the absolute value of the in-plane retardation at a wavelength of 550 nm.

The second optical compensation film more preferably satisfies the following relation:

$$50 \text{ nm} < |Re(550)| \leq 300 \text{ nm}.$$

The second optical compensation film may be composed of any material having the retardation mentioned above. A polymer film or a polymeric liquid crystal composition is preferred due to ease of production. A preferred polymer film is selected from a cellulose acylate film, a cyclic olefin polymer film, or an acrylic polymer film. A preferred acrylic polymer film contains at least one of a lactone cyclic unit, a maleic anhydride unit, and a glutaric anhydride unit. The liquid crystal compound may be any known rod-like or discotic liquid crystal compound and preferably has polymerizable groups to fix the alignment state. The liquid crystal compound may have a laminated structure including the polymer film mentioned above as a support.

If the second optical compensation film used is a film having a fixed alignment of liquid crystal compounds, the second optical compensation film preferably adjoins the polarizer.

A single film composed of a composition containing liquid crystal compounds having polymerizable groups may be used as a second optical compensation film through peeling.

A preferred polymer film has a small thickness that reduces the thickness of the liquid crystal display and maintains the optical characteristics, the mechanical properties, and the manufacturing adaptability. The thickness preferably is in the range of 1 to 90 μm, more preferably 1 to 70 μm, most preferably 1 to 50 μm.

Second optical compensation films composed of a monolayer and a double-layer will now be described.

(1) The second optical compensation film according to a first embodiment is composed of a monolayer. The second optical compensation film according to this embodiment preferably satisfies the following relations:

$$150 \text{ nm} \leq Re(550) \leq 300 \text{ nm};$$

and $$-100 \text{ nm} \leq Rth(550) \leq 100 \text{ nm}.$$

More preferably, the second optical compensation film satisfies the following relations:

200 nm≤Re(550)≤250 nm;

and

−50 nm≤Rth(550)≤50 nm.

The second optical compensation film according to the first embodiment is preferably composed of a monolayer for the reduction of panel thickness and the number of members.

The second optical compensation film is prepared by extensively stretching a polymer film satisfying nz>nx.

A second optical compensation film composed of for example, cellulose acetate benzoate, which is a cellulose acylate substituted by an aromatic acyl group, can be prepared by casting a dope, which is obtained by dissolving cellulose acetate benzoate in a solvent, on a metal support for film formation; drying the solvent to obtain a film; and aligning the cellulose molecular chains by stretching the resulting film to a length of 1.3 to 1.9 times the original length.

The thickness of a second optical compensation film composed of a monolayer is preferably in the range of 1 to 90 μl, more preferably 1 to 70 μm, most preferably 1 to 50 μm.

(2) A second optical compensation film according to a second embodiment is composed of two films: a biaxial film (B-plate) satisfying nx>ny>nz and a [semi]-uniaxial film (positive [semi]-C-plate) satisfying nx nearly equal to ny<nz.

In this embodiment, the two films of the second optical compensation film may be laminated in any order. If the uniaxial film is disposed adjacent to a cell substrate and the biaxial film is disposed adjacent to a second polarizer, the biaxial film is disposed such that its slow axis is orthogonal to the absorption axis of the second polarizer. If the biaxial film is disposed adjacent to the cell substrate and the uniaxial film is disposed adjacent to the second polarizer, the biaxial film is disposed such that its slow axis is parallel to the absorption axis of the second polarizer.

(Biaxial Film)

The biaxial film of the second optical compensation film preferably satisfies the following relations:

0 nm≤Re(550)≤200 nm;

and 0 nm≤Rth(550)≤200 nm.

The biaxial film of the second optical compensation film more preferably satisfies the following relations:

50 nm≤Re(550)≤150 nm;

and 50 nm≤Rth(550)≤150 nm.

The biaxial film can be prepared by stretching a cellulose acylate film, a cyclic polyolefin film, or a polycarbonate polymer film, each of which is prepared through an appropriate process such as melt film formation or solution deposition. The stretching process may be any one of longitudinal stretching with rollers rotating at a controlled rim speed, lateral stretching with a tenter, and biaxial stretching. For specific examples, refer to Japanese Patent Application Laid-Open No. 2005-338767. The biaxial film may be composed of a polymer having biaxiality due to the alignment that is prepared from a composition of liquid crystal compounds having polymerizable groups.

([Semi]-Uniaxial Film)

The [semi]-uniaxial film of the second optical compensation film preferably satisfies the following relations:

−100 nm≤Re(550)≤100 nm;

and

−250 nm≤Rth(550)≤0 nm.

The [semi]-uniaxial film of the second optical compensation film more preferably satisfies the following relations:

−50 nm≤Re(550)≤50 nm;

and

−200 nm≤Rth(550)≤−100 nm.

The [semi]-uniaxial film, for example, is a cellulose acylate film, a cyclic polyolefin film, or a polycarbonate polymer film prepared so as not to have in-plane retardation, and through stretching in the thickness direction (nz) with a heat-shrinkable film. Alternatively, a film having a desired retardation can be prepared through the fixing of the alignment state of the liquid crystal material, e.g., the vertical alignment of rod-like liquid crystal compounds.

The thickness of the second optical compensation film according to the second embodiment is preferably in the range of 1 to 180 μm, more preferably 1 to 140 μm, most preferably 1 to 100 μm.

(3) A second optical compensation film according to a third embodiment is composed of two films: a biaxial film (B-plate) satisfying nx>nz>ny and a [semi]-uniaxial film (negative [semi]-C-plate) satisfying nx nearly equal to ny>nz.

In this embodiment, the two films of the second optical compensation film may be laminated in any order. If the uniaxial film is disposed adjacent to a cell substrate and the biaxial film is disposed adjacent to a second polarizer, the biaxial film is disposed such that its slow axis is parallel to the absorption axis of the second polarizer. If the biaxial film is disposed adjacent to a cell substrate and the uniaxial film is disposed adjacent to a second polarizer, the biaxial film is disposed such that its slow axis is orthogonal to the absorption axis of the second polarizer.

(Biaxial Film)

The biaxial film of the second optical compensation film preferably satisfies the following relations:

0 nm≤Re(550)≤200 nm;

and

−200 nm≤Rth(550)≤0 nm.

The biaxial film of the second optical compensation film more preferably satisfies the following relations:

50 nm≤Re(550)≤150 nm;

and

−150 nm≤Rth(550)≤−50 nm.

The biaxial film is prepared by forming a negative intrinsic birefringence film, such as a cellulose acylate film with a high degree of substitution or a film composed of styrene, its derivative, polycarbonate, acrylic resin, or polyester such as fumaric diester, such that the film has in-plane retardation.

The biaxial film composed of cellulose acetate can be prepared by casting a dope, which is obtained by dissolving cellulose acetate in a solvent, on a metal support for film formation; drying the solvent to obtain a film; and aligning the cellulose molecular chains by stretching the resulting film to a length of 1.3 to 1.9 times the original length.

(Uniaxial Film)

The uniaxial film of the second optical compensation film preferably satisfies the following relations:

$-100$ nm≤Re(550)≤100 nm;

and $250$ nm≤Rth(550)≤0 nm.

The uniaxial film of the second optical compensation film more preferably satisfies the following relations:

$-50$ nm≤Re(550)≤50 nm;

and $50$ nm≤Rth(550)≤200 nm.

The uniaxial film may be prepared as follows: a film having a retardation of nz>nx is formed under a fixed alignment of liquid crystal materials; a cellulose acylate film, a cyclic polyolefin film, or a polycarbonate polymer film is formed so as not to have in-plane retardation; or a cellulose acylate film, a cyclic polyolefin film, or a polycarbonate polymer film is formed such that in-plane retardation is canceled out to establish nx nearly equal to ny. Alternatively, the uniaxial film may be prepared with a composition of a discotic liquid crystal compound having polymerizable groups, for example, through the horizontal alignment of the discotic liquid crystal compound.

The thickness of the second optical compensation film according to the third embodiment is preferably in the range of 1 to 180 μm, more preferably 1 to 140 μm, most preferably 1 to 100 μm.

A known additive, such as a plasticizer, may be appropriately added to the second optical compensation film. Examples of such additives are described in paragraphs 0138 to 0188 of Japanese Patent Application Laid-Open No. 2013-047794.

<IPS Liquid Crystal Cell Driven by Transverse Electric Field>

Any known IPS liquid crystal cell driven by a transverse electric field may be employed in the present invention. Such a cell is disclosed, for example, in Japanese Patent Application Laid-Open No. 2013-019943.

The "optical axis" of the liquid crystal layer in the liquid crystal cell refers to an axis that has the highest refractive index if the liquid crystal in the cell has positive birefringence. In other words, the optical axis of the uniaxial liquid crystal in the cell is the rotational axis of the index ellipsoid, whereas the optical axis of biaxial liquid crystal is the slow axis.

The tilt angle of the optical axis is preferably uniform throughout the liquid crystal cell. Alternatively, the tilt angle of the optical axis of the liquid crystal cell may be nonuniform, which is happened by a spray alignment or a hybrid alignment. If the upper and lower interfaces of the liquid crystal cell have different tilt angles, the tilt angle of the optical axis of the liquid crystal in the cell can be defined as the average tilt angle of the upper and lower interface of the liquid crystal.

<First Polarizer and Second Polarizer>

Any known first polarizer and second polarizer may be employed in the present invention.

Atypical linear polarizer may be employed in the present invention. The linear polarizer is preferably a coating polarizer, such as that manufactured by Optiva Inc., or a polarizer composed of a binder and one of iodine and dichroic dyes. The molecules of iodine or dichroic dye in the linear polarizer are aligned in the binder to establish polarization ability. The molecules of iodine or dichroic dye preferably are aligned along the binder molecules. Alternatively, the dichroic dye molecules may be aligned in a single direction by self-organization, such as in liquid crystal. A current commercially available polarizer is typically prepared through the immersion of a stretched polymer into a solution of iodine or dichroic dye in a bath so that the iodine or dichroic dye penetrates into a binder.

The first polarizer and the second polarizer each may have any thickness, preferably a thickness of 50 μm or less.

<Polarizer Protective Film>

In general, a polarizing plate is composed of a laminate of a polarizer and a polarizer protective film for the protection of the polarizer.

The protective film of the polarizing plate adjacent to the liquid crystal cell may also serve as a first optical compensation film or a second optical compensation film. If the protective film only provides protection, the preferred optical characteristics are:

$-50$ nm≤Re(550)≤50 nm, and $-50$ nm≤Rth(550)≤50 nm, where Re(550) represents in-plane retardation (nm) at a wavelength of 550 nm, and Rth(550) represents retardation (nm) across the thickness at a wavelength of 550 nm. The protective film having optical isotropy is preferred except for the retardation film provided for optical compensation.

The protective film of the polarizing plate on the side opposite to the liquid crystal cell provides physical protection, light resistance, and weatherability. These functions can be established through the direct application of conpounds, such as an ultraviolet absorber, to a film or through the lamination of a functionality layer.

Such a polarizer protective film is composed of, for example, cellulose acylate, polycarbonate, polysulfone, polyethersulfone, polyacrylate, polymethacrylate, cyclic polyolefin, polyolefin, polyamide, polystyrene, or polyester. The protective film is preferably composed of cellulose acylate, cyclic polyolefin, polyacrylate, or polymethacrylate, more preferably cellulose acetate. Alternatively, a commercially available cellulose acetate film may be used (such as "TD80U" or "Z-TAC" manufactured by Fujifilm Corporation).

The polarizer protective film of the polarizing plate on the side opposite to the liquid crystal cell preferably has a low moisture permeability to prevent uneven image display and improve the durability of the polarizing plate. Such a polarizer protective film may be composed of a polymer monolayer having low moisture permeability. Alternatively, the film may be laminated with a functionality layer that reduces the moisture permeability.

In this description, Re(λ) and Rth(λ) are retardation (nm) in plane and retardation (nm) along the thickness direction, respectively, at a wavelength of λ. Re(λ) is measured by applying light having a wavelength of λ nm to a film in the normal direction of the film, using KOBRA 21ADH or WR (by Oji Scientific Instruments). The selection of the measurement wavelength may be conducted according to the manual-exchange of the wavelength-selective-filter or according to the exchange of the measurement value by the program.

When a film to be analyzed is expressed by a monoaxial or biaxial index ellipsoid, Rth(λ) of the film is calculated as follows. This measuring process is also applied to the measurement of the average tilt angle of discotic liquid crystal molecules in the retardation layer on the side adjacent to the alignment film and the average tilt angle for on the opposite side, as described below.

Rth(λ) is calculated by KOBRA 21ADH or WR on the basis of the six Re(λ) values which are measured for incoming light of a wavelength λ nm in six directions which are decided by a 10° step rotation from 0° to 50° with respect to the normal direction of a sample film using an in-plane slow axis, which is decided by KOBRA 21ADH, as an inclination axis (a rotation axis; defined in an arbitrary in-plane direction if the film has no slow axis in plane), a value of hypothetical mean refractive index, and a value entered as a thickness value of the film.

In the above, when the film to be analyzed has a direction in which the retardation value is zero at a certain inclination angle, around the in-plane slow axis from the normal direction as the rotation axis, then the retardation value at the inclination angle larger than the inclination angle to give a zero retardation is changed to negative data, and then the Rth(λ) of the film is calculated by KOBRA 21ADH or WR.

Around the slow axis as the inclination angle (rotation angle) of the film (when the film does not have a slow axis, then its rotation axis may be in any in-plane direction of the film), the retardation values are measured in any desired inclined two directions, and based on the data, and the estimated value of the mean refractive index and the inputted film thickness value, Rth may be calculated according to formulae (A) and (III):

$$Re(\theta) = \left[nx - \frac{ny \times nz}{\sqrt{\left\{ny\sin\left(\sin^{-1}\left(\frac{\sin(-\theta)}{nx}\right)\right)\right\}^2 + \left\{nz\cos\left(\sin^{-1}\left(\frac{\sin(-\theta)}{nx}\right)\right)\right\}^2}}\right] \times \frac{d}{\cos\left\{\sin^{-1}\left(\frac{\sin(-\theta)}{nx}\right)\right\}} \quad (A)$$

Re(θ) represents a retardation value in the direction inclined by an angle θ from the normal direction; nx represents a refractive index in the in-plane slow axis direction; ny represents a refractive index in the in-plane direction perpendicular to nx; and nz represents a refractive index in the direction perpendicular to nx and ny. And "d" is a thickness of the film.

$$Rth = \{(nx+ny)/2 - nz\} \times d \quad (III)$$

In the formula, nx represents a refractive index in the in-plane slow axis direction; ny represents a refractive index in the in-plane direction perpendicular to nx; and nz represents a refractive index in the direction perpendicular to nx and ny. And "d" is a thickness of the film.

When the film to be analyzed is not expressed by a monoaxial or biaxial index ellipsoid, or that is, when the film does not have an optical axis, then Rth(λ) of the film may be calculated as follows:

Re(λ) of the film is measured around the slow axis (judged by KOBRA 21ADH or WR) as the in-plane inclination axis (rotation axis), relative to the normal direction of the film from −50 degrees up to +50 degrees at intervals of 10 degrees, in 11 points in all with a light having a wavelength of λ nm applied in the inclined direction; and based on the thus-measured retardation values, the estimated value of the mean refractive index and the inputted film thickness value, Rth(λ) of the film may be calculated by KOBRA 21ADH or WR.

In the above-described measurement, the hypothetical value of mean refractive index is available from values listed in catalogues of various optical films in Polymer Handbook (John Wiley & Sons, Inc.). Those having the mean refractive indices unknown can be measured using an Abbe refract meter. Mean refractive indices of some main optical films are listed below:

cellulose acylate (1.48), cycloolefin polymer (1.52), polycarbonate (1.59), polymethylmethacrylate (1.49) and polystyrene (1.59). KOBRA 21ADH or WR calculates nx, ny and nz, upon enter of the hypothetical values of these mean refractive indices and the film thickness. On the basis of thus-calculated nx, ny and nz, Nz=(nx−nz)/(nx−ny) is further calculated.

The Re and Rth are measured at a wavelength λ of 550 nm in the visible light range, unless otherwise specified.
(Measurement of Tilt Angles of Retardation Layer and Liquid Crystal Cell)

The tilt angles θ1 and θ2 cannot be directly and exactly determined where the tilt angle θ1 is defined between the optical axis of the retardation layer and the interface of the retardation layer on one of the surfaces of the retardation layer, and the tilt angle θ2 is defined between the optical axis of the retardation layer and the interface of the retardation layer on the other surface of the retardation layer. According to the present invention, the tilt angles θ1 and θ2 are calculated through the following process. Although the values obtained through such calculation do not accurately represent the actual state of the present invention, it is useful as a means representing a relative relation between some optical characteristics of an optical film.

For simplification, the tilt angles at the two interfaces of the retardation layer (which is also referred to as "optically-anisotropic layer") are calculated under the following two presumptions:

1. The retardation layer has a multi-layer structure; and
2. The tilt angle of each layer varies monotonously across the thickness of the retardation layer as a linear function.

Details of the calculation are described below.

(1) The incident angle of the measurement light on the retardation layer is varied within the plane in which the tilt angle of each layer varies monotonously across the thickness of the retardation layer as a linear function. The retardation is determined at three or more measuring angles. For simplification of the measurement and calculation, the direction of the normal line to the retardation layer is defined as 0 degrees. The retardation is preferably determined at three measuring angles: −40, 0, and +40 degrees. The measurement can be conducted using KOBRA-21ADH or KOBRA-WR (manufactured by Oji Scientific Instruments), a transmissive ellipsometer AEP-100 (manufactured by Shimadzu Corporation), M150 or M520 (manufactured by JASCO Corporation), or ABR10A (manufactured by Uniopt Corporation, Ltd.).

(2) In the model described above, "no" represents the refractive index of ordinary light in each layer, "ne" represent the refractive index of extraordinary light ("ne" and "no" each have the same value for all the layers), and "d" represents the total thickness of the multi-layer structure.

Under the presumption that the tilt angle of each layer coincides with the angle of the uniaxial optical axis of the corresponding layer, the tilt angles θ1 and θ2 on both sides of the retardation layer calculated through fitting of the tilt angles θ1 and θ2 as variables such that the measured retardation of the retardation layer coincides with the calculated retardation of the retardation layer depending on angle.

The refractive indices "no" and "ne" may be selected from known values, such as those listed in publications and catalogs. If the values are unknown, values can be measured with an Abbe refractometer. The thickness of the retardation layer can be measured with an optical interference thickness gauge or from a cross-sectional photograph observed with a scanning electron microscope.

EXAMPLES

Paragraphs below will further specifically describe features of the present invention, referring to Examples and Comparative Examples. Any materials, amount of use, ratio, details of processing, procedures of processing and so forth shown in Examples may appropriately be modified without departing from the spirit of the present invention. Therefore, it is to be understood that the scope of the present invention should not be interpreted in a limited manner based on the specific examples shown below.

<Preparation of First Optical Compensation Film>
<<Production of First Optical Compensation Film (Examples 1, 2, 4, 5, 8, and 9)>>

A commercially available triacetyl cellulose film "Z-TAC" (manufactured by Fujifilm Corporation) was used as a support. The Z-TAC film was passed through dielectric heating rollers at a temperature of 60° C. After the surface temperature of the film reached 40° C., an alkaline solution having a composition listed below was applied to one side of the film with a bar coater into a density of 14 ml/m². The film was heated to 110° C., and then conveyed under a far-infrared steam heater manufactured by Noritake Co., Ltd. for 10 seconds. Pure water was then applied with a bar coater into a density of 3 ml/m². After washing in water with a fountain coater and drying with an air knife was repeated three times, the film was conveyed through a 70° C. drying zone for 10 seconds to form an alkali-saponified acetyl cellulose transparent support.

Composition of alkaline solution (parts by mass)

| Potassium hydroxide | 4.7 parts by mass |
|---|---|
| Water | 15.8 parts by mass |
| 2-Propanol | 63.7 parts by mass |
| Surfactant | 1.0 parts by mass |
| SF-1: $C_{14}H_{29}O(CH_2CH_2O)_{20}H$ | |
| Propylene glycol | 14.8 parts by mass |

A coating solution for an alignment film A having the composition listed below was uninterruptedly applied to the acetyl cellulose transparent support with a #8 wire bar. The support was dried in hot air at 60° C. for 60 seconds and then in hot air at 100° C. for 120 seconds to form an alignment film A.

Composition of Coating Solution for Alignment Film A

| Polymer material for alignment film (PVA 103, polyvinyl alcohol manufactured by Kuraray Co., Ltd.) | 4.0 parts by mass |
|---|---|
| Methanol | 36 parts by mass |
| Water | 60 parts by mass |

The alignment film A on the surface of the acetyl cellulose transparent support was rubbed continuously in the conveying direction of the film. A coating solution for an optically-anisotropic layer was applied to the rubbed surface with a bar coater. The applied liquid was heated at film surface temperature of 60° C. for 60 seconds and irradiated with ultraviolet rays emerging from a 20 mW/cm² air-cooled metal halide lamp (manufactured by Eye Graphics Co., Ltd.) in air to fix the alignment state. Through these procedures, a retardation layer of the first optical compensation film was formed. The retardation layer of the first optical compensation film horizontally aligned the rod-like liquid crystal molecules with the slow axis parallel to the rubbing direction. The thickness of the retardation layer was 1.0 μm. The dependency of the retardation Re and the tilt angle of the optical axis on the light incident angle were measured with an automatic birefringence meter (KOBRA-21ADH manufactured by Oji Scientific Instruments Co., Ltd.). The retardations Re and Rth at a wavelength of 550 nm were 60 nm and 30 nm, respectively, and the tilt angle of the optical axis was two degrees.

First optical compensation films having different tilt angles were obtained by varying the amount of a fluorinated compound A or B in the coating solution for the retardation layer. The first optical compensation films having different retardations Re and Rth were obtained by varying the thickness of the coating solution.

Composition of Coating Solution A for Retardation Layer

| Rod-like liquid crystal compound 1 | 90 parts by mass |
|---|---|
| Rod-like liquid crystal compound 2 | 10 parts by mass |
| Photopolymerization initiator (Irgacure 907 manufactured by Chiba Specialty Chemicals Corporation) | 3.0 parts by mass |
| Sensitizer (Kayacure-DETX manufactured by Nippon Kayaku Co., Ltd.) | 1.0 parts by mass |
| Fluorinated compound A | 0.5 parts by mass |
| Fluorinated compound B | 0 parts by mass |
| Methyl ethyl ketone | 400 parts by mass |

Rod-like liquid crystal compound 1

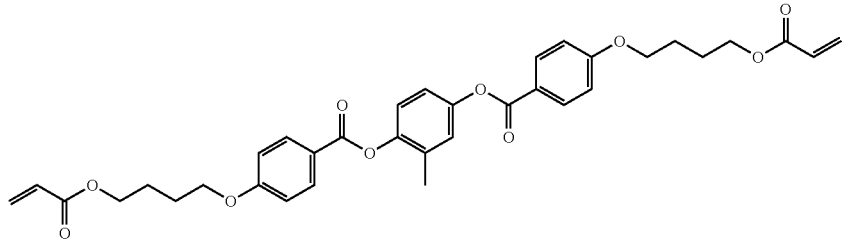 [SMILES: C=CC(=O)OCCCCOc1ccc(C(=O)Oc2ccc(OC(=O)c3ccc(OCCCCOC(=O)C=C)cc3)c(C)c2)cc1]

Rod-like liquid crystal compound 2

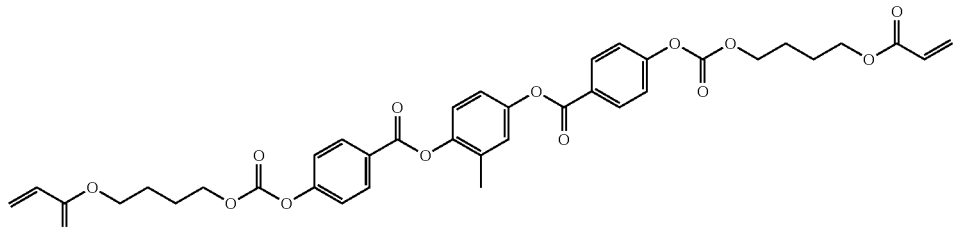

Fluorinated compound A

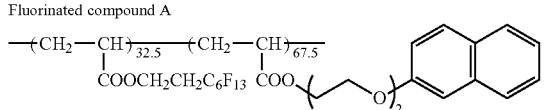

Fluorinated compound B

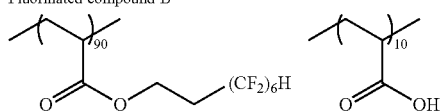

<<Production of First Optical Compensation Film (Example 3)>>

The first optical compensation film according to Example 3 was prepared in accordance with the procedures described in Japanese Patent Application Laid-Open No. 2010-84032 except that the rod-like liquid crystal compound 1 was substituted for the compound described below.

original length in an iodine solution and dried to form a polarizer having a thickness of 20 μm. The TD80UL support and the polarizer were bonded together with a solution of polyvinyl alcohol adhesive to form a polarizing plate having one side covered with the TD80UL support and the other side exposed. The polarizer side of the polarizing plate was rubbed to form a first optical compensation film on the

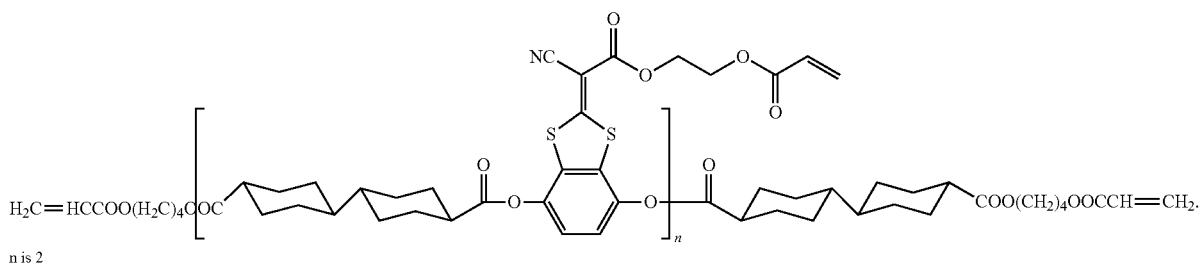

n is 2

<<Production of First Optical Compensation Film (Example 6)>>

Production of Compensation Film Through Direct Application To Polarizer

The surface of a support composed of TD80UL (manufacture by Fujifilm Corporation) was alkali-saponified. The support was immersed in a sodium hydroxide 1.5 N solution at 55° C. for two minutes, washed in a water bath at room temperature, and neutralized with 0.1N sulfuric acid at 30° C. The support was washed again in a water bath at room temperature and dried in hot air at 100° C.

A roll of polyvinyl alcohol film having a thickness of 80 μm was continuously stretched to a length 5 times the polarizer through the same procedures for preparing the first optical compensation film described above. In this way, a polarizing plate according to Example 6 was obtained.

<<Production of First Optical Compensation Film (Example 7)>>

Production of Compensation Film Through Oblique Deposition

An oblique deposition layer was formed on a glass substrate of the liquid crystal cell in accordance with the procedures described in Japanese Patent Application Laid-Open No. 2007-178536 to form a first optical compensation film according to Example 7.

<<Production Of First Optical Compensation Film (Example 10)>>

Through the process for preparing the first optical compensation film according to Example 1, an alignment film and a retardation layer were applied to an acetyl cellulose transparent support without alkali saponification treatment, and the support was then removed to obtain a support-free first optical compensation film.

<<Production of First Optical Compensation Film (Example 11)>>

A thin gelatin film (0.1 μm) applied to a commercially available triacetyl cellulose film "Z-TAC" (manufactured by Fujifilm Corporation) was used as the support. A soluble polyimide (Optmer AL1051 manufactured by Japan Synthetic Rubber Co., Ltd.) was applied to the gelatin film and heated at 120° C. to remove the solvent. Then, the surface was rubbed in the same way as in Example 1 to form an alignment film B.

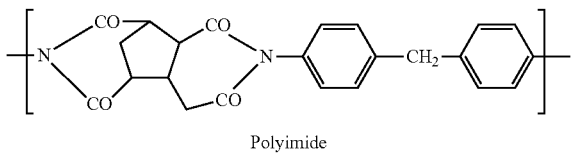

Polyimide

A coating solution A for a retardation layer was applied to the alignment film B as in Example 1 to form a first optical compensation film used in Example 11.

<Preparation of Second Optical Compensation Film>
<<Production of Monolayer Second Optical Compensation Film (Example 8, Comparative Example 4)>>
(1) Dope Preparation
Cellulose Acylate Solution A The components in the composition listed below were placed in a mixing tank and dissolved by mixing. The mixture was heated at 90° C. for approximately 10 minutes and filtered through a paper filter having an average pore size of 34 μm and then a sintered metallic filter having an average pore size of 10 μm.

Cellulose Acylate Solution A

| | |
|---|---|
| Cellulose acylate (degree of substitution: benzoyl group, 0.86; acetyl group, 1.76) | 100.0 parts by mass |
| Dichloromethane | 462.0 parts by mass |

(2) Film Formation by Casting

A dope was cast using a metal band casting machine and dried. The resulting film was peeled off from the band with a peeling drum. An unstretched film was prepared in this way.

(3) Stretching

While both ends of the resulting film were fixed, the film was uniaxially stretched in the film conveying direction (MD) by 10% in a tenter zone at −5° C., which equaled (the glass-transition temperature Tg)−(the stretching temperature). The stretched film was further uniaxially stretched while both ends were fixed in the width direction (TD) by 65% in the tenter zone at −5° C. The cellulose acylate film was prepared through such biaxial stretching. The thickness of the cast film after stretching and drying was adjusted to 60 μm.

A measurement of the optical characteristics determined that the retardation Re was 240 nm and the retardation Rth was 5 nm.

The second optical compensation films of Example 8 and Comparative Example 4 were prepared through the procedures described above.

<<Production of Double-layer Second Optical Compensation Film>>

(1) Production of Second Optical Compensation Film Having B-Plate and Positive C-Plate (Examples 1 to 7, 10, 11, Comparative Examples 1 to 3)

Production of B-Plate

The components in the composition listed below were placed in a mixing tank and dissolved by mixing to prepare a cellulose acylate solution B.

Cellulose Acylate Solution B

| | |
|---|---|
| Cellulose acetate (degree of substitution: 2.46) | 100.0 parts by mass |
| Compound A*[1] | 19.0 parts by mass |
| Methylene chloride | 365.5 parts by mass |
| Methanol | 54.6 parts by mass |

*[1]Compound A is a copolymer of terephthalic acid, succinic acid, propylene glycol, and ethylene glycol with a monomer content (mol %) of 27.5, 22.5, 25, and 25, respectively.

Cellulose Acylate Solution C for Skin Layer

The components in the composition listed below were placed in a mixing tank and dissolved by mixing to prepare a cellulose acylate solution C.

Cellulose Acylate Solution C

| | |
|---|---|
| Cellulose acetate (degree of substitution: 2.79) | 100.0 parts by mass |
| Compound A*[1] | 11.0 parts by mass |
| Silica particles R972 (manufactured by Nippon Aerosil Co., Ltd.) | 0.15 parts by mass |
| Methylene chloride | 395.0 parts by mass |
| Methanol | 59.0 parts by mass |

*[1]Compound A is a copolymer of terephthalic acid, succinic acid, propylene glycol, and ethylene glycol with a monomer content (mol %) of 27.5, 22.5, 25, and 25, respectively.

The cellulose acylate solution B was cast to form a core layer having a thickness of 90 μm, and the cellulose acylate solution C was cast to form a skin A layer having a thickness of 2 μm and a skin B layer having a thickness of 2 μm.

The resulting web or film was peeled from the band and dried. The dried film was then reeled. The residual solvent was 0% to 0.5% of the total mass of the film. The dried film was unreeled and conveyed to a tenter. At the tenter, the film was stretched in the TD direction by 75% at 190° C. to form a retardation layer 1 of the second optical compensation film of Example 1. A measurement of the optical characteristics determined that the retardation Re was 100 nm and the retardation Rth was 100 nm.

The retardation layers of Examples 2 to 7, 10, 11, and Comparative Examples 1 to 3 were also prepared through the same procedures.

Production Of Positive C-Plate

The surface of the B-plate prepared as described above was saponified. A commercially available material for a vertical alignment film (JALS-204R manufactured by Japan Synthetic Rubber Co., Ltd.) was diluted into 1:1 with methyl ethyl ketone and then applied on the saponified B-plate with a wire bar coater into a density of 2.4 mL/m². Immediately after the application, the film was dried in hot air at 120° C. for 120 seconds.

To prepare a solution, 3.8 g of a rod-like liquid crystal compound 2, 0.06 g of a photopolymerization initiator (Irgacure 907 manufactured by Nihon Ciba-Geigy K. K.), 0.02 g of a sensitizer (Kayacure-DETX manufactured by Nippon Kayaku Co., Ltd.), and 0.002 g of vertical aligning agent for the air interface, which is illustrated below, were dissolved in 9.2 g methyl ethyl ketone. The solution was applied to the alignment film on the B-plate with #3.4 wire bars. The B-plate was then attached to a metal frame and heated in an isothermal bath at 100° C. for two minutes to align the rod-like liquid crystal compound. The B-plate was then irradiated with ultraviolet rays emerging from a 120 W/cm high-pressure mercury lamp at 80° C. for 20 seconds to cross-link the rod-like liquid crystal compound and then cooled to room temperature to form the retardation layer.

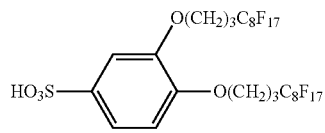

(II-4)

Vertical aligning agent for the air interface
Compound disclosed Japanese Patent
Application No. 119959/2003

The dependency of the retardation Re of the prepared film on the light incident angle was measured with an automatic birefringence meter (KOBRA-21ADH manufactured by Oji Scientific Instruments Co., Ltd.). The optical characteristics of the region to which the retardation layer was applied were calculated by subtracting the contribution of the support measured in advance from the values measured with the automatic birefringence meter. The retardation Re of the region was 0 nm and Rth was −155 nm, confirming that the rod-like liquid crystal in the film was aligned substantially vertically. Through these procedures, the retardation layer 2 of the second optical compensation film of Example 1 was obtained.

The retardation layers of Examples 2 to 7, 10, 11, and Comparative Examples 1 to 3 were also prepared through the same procedures.

(2) Production of Second Optical Compensation Film Having B-Plate and Negative C-Plate (Example 9, Comparative Example 5)

Production of B-Plate

A polarizing plate was removed from a 42Z1 liquid crystal television display manufactured by Toshiba Corporation. The B-plate was then peeled from the polarizing plate. The dependency of the retardation Re on the light incident angle was measured with an automatic birefringence meter (KOBRA-21ADH manufactured by Oji Scientific Instruments Co., Ltd.). The retardations Re and Rth were 110 nm and −100 nm, respectively.

Production of Negative C-Plate

The components in the composition listed below were placed in a mixing tank and dissolved by mixing. The mixture was heated at 90° C. for approximately 10 minutes and filtered through a paper filter having an average pore size of 34 μm and then a sintered metallic filter having an average pore size of 10 μm.

Cellulose Acetate Solution D

| | |
|---|---|
| Cellulose acetate (degree of substitution: 2.79) | 100.0 parts by mass |
| Polycondensed ester PB-35 | 9.0 parts by mass |
| Compound 1 | 0 to 10 parts by mass |
| Dichloromethane | 403.0 parts by mass |
| Methanol | 60.2 parts by mass |

-continued

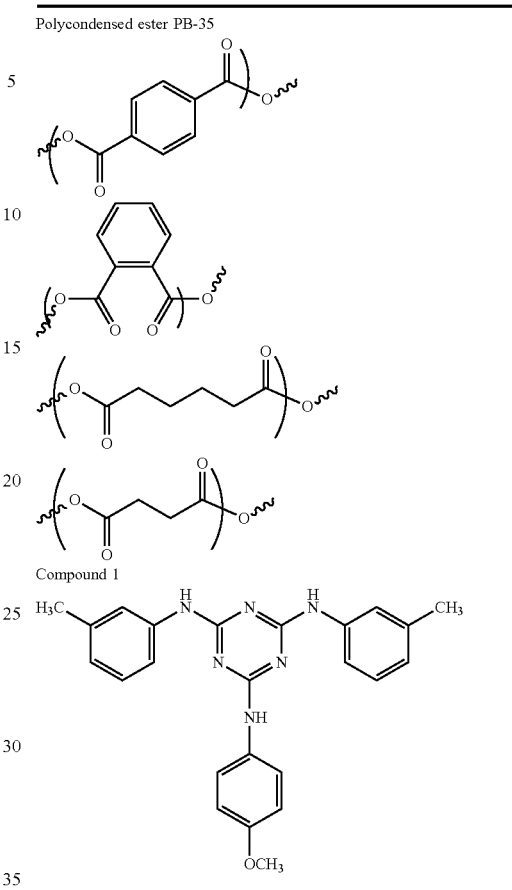

The flow of the polymer dope at a die ejection port was adjusted to form a polymer film having a thickness of 58 μm. The polymer dope was cast onto a stainless steel band at a dope temperature of 36° C. After the polymer film was dried and peeled off from the band, the in-plane retardation Re was measured with an automatic birefringence meter KOBRA-WR (manufactured by Oji Scientific Instruments Co., Ltd.) through a three-dimensional birefringence measurement at a wavelength of 550 nm. The measured retardations Re and Rth were 0 nm and 110 nm, respectively.

The B-plate and the negative C-plate were bonded together with a polyvinyl alcohol adhesive to form a second optical compensation film.

<Production of Polarizing Plate>

The surface of a support composed of TD80UL (manufacture by Fujifilm Corporation) was alkali-saponified. The support was immersed in a 1.5 N sodium hydroxide solution at 55° C. for two minutes, washed in a water bath at room temperature, and neutralized with 0.1 N sulfuric acid at 30° C. The support was washed again in a water bath at room temperature and dried in hot air at 100° C. A roll of polyvinyl alcohol film having a thickness of 80 μm was continuously stretched to a length of 5 times the original length in an iodine solution and dried to obtain a polarizer having a thickness of 20 μm.

The optical compensation film prepared above was bonded to the other surface of the polarizer to form a polarizing plate having the TD80UL and the optical compensation film as protective films. A solution of a polyvinyl alcohol adhesive was used for bonding. The polarizer was laminated with the first optical compensation film and the monolayer second optical compensation film such that the slow axes of the optical compensation films to be bonded together were parallel to the absorption axis of the polarizer. For the double-layer second optical compensation film having a positive C-plate, the polarizer was laminated such that the slow axis of the B-plate was orthogonal to the absorption axis of the polarizer and the B-plate adjoined the polarizer. For the double-layer second optical compensation film having a negative C-plate, the polarizer was laminated such that the slow axis of the B-plate was parallel to the absorption axis of the polarizer and the B-plate adjoined the polarizer.

<Production of Liquid Crystal Display>

Polarizing plates were removed from both sides of the liquid crystal cell of an iPad device manufactured by Apple, Inc. and was used as a liquid crystal cell of an IPS mode. The pre-tilt angle was 2.0 degrees, and Δn·d=350 nm.

The liquid crystal display device of Example 1 was produced by arraying a polarizing plate having a first optical compensation film, a liquid crystal cell, and a polarizing plate having a second optical compensation film, in sequence. The layers were bonded together such that the absorption axis of the first polarizer, the optical axis of the first optical compensation film, and the optical axis of the liquid crystal layer in the liquid crystal cell were parallel to each other in view of a direction orthogonal to the surface of the liquid crystal cell substrate, and the optical axis of the first optical compensation film had a tilt angle listed in Table 1 from the surface of the liquid crystal cell substrate. A positive tilt angle listed in Table 1 indicates that the optical axis of the liquid crystal in the cell tilts in the same direction as the optical axis of the first optical compensation film. A negative tilt angle indicates that the optical axes tilt in opposite directions. The liquid crystal display devices of the other examples and comparative examples were produced as in Example 1 using different first and second optical compensation films as listed in the table below.

<Evaluation>

The display characteristics were measured with a commercially available device for measuring a viewing angle and chromaticity, Ezcom (manufactured by Eldim S.A.), and a backlight of a commercially available liquid crystal display iPad device (manufactured by Apple, Inc.). The measurements were carried out by placing a liquid crystal cell having bonded polarizing plates such that the first optical compensation film is adjacent to the backlight in Examples 1 to 9 and 11 and Comparative Examples 1 to 5 or such that the first optical compensation film is remote from the backlight in Example 10.

<<Tint Index: hab σ>>

The standard deviation σ indicating a variation in the hue angle "hab" was determined from a variation in black tint at a polar angle of 60 degrees plotted (in 5-degree increment) on an a*b* plane. A large standard deviation σ indicates a large variation in the hue. The standard deviation σ was evaluated by the following four criteria:
A: 50 or less
B: more than 50 and 70 or less
C: more than 70 and 90 or less
D: more than 90

<<Tint Index: Δu'v'>>

The tint index was defined as a maximum variation range (Δu'v') in black tint at a polar angle of 60 degrees plotted (in 5-degree increment) on a u'v' plane. A large variation range indicates a large variation in the hue. The values of the variation range were evaluated by the four criteria:
A: 0.1 or less
B: more than 0.1 and 0.15 or less
C: more than 0.15 and 0.20 or less
D: more than 0.20

<<Light Leak Index>>

The light leak index was defined as the average of a maximum value (luminance max) of the black brightness ($Cd/m^2$) in top view (in 5-degree increment from 0 to 180 degrees) and a maximum value in bottom view (in 5-degree increment from 180 to 360 degrees).

A small black brightness indicates low light leak. The black brightness was evaluated by the following four criteria.
A: 0.65 or less
B: more than 0.65 and 0.70 or less
C: more than 0.70 and 0.80 or less
D: more than 0.80

TABLE 1A

| | | First optical compensation layer | | | | | | |
| --- | --- | --- | --- | --- | --- | --- | --- | --- |
| | Structure | Fluorinated compound A | Fluorinated compound B | Alignment film | Support (Re/Rth) | Retardation film (Re/Rth) | Tilt angle | Wavelength dispersion 450/550 |
| Example1 | FIG. 1 | 0.5 | 0 | A | 0/−1 | 60/30 | 2 | 1.09 |
| Example2 | FIG. 1 | 0.5 | 0 | A | 0/−1 | 90/45 | 2 | 1.09 |
| Example3 | FIG. 1 | 0.5 | 0 | A | 0/−1 | 90/45 | 2 | 0.88 |
| Example4 | FIG. 1 | 0.5 | 0.02 | A | 0/−1 | 50/25 | 3 | 1.09 |
| Example5 | FIG. 1 | 0.5 | 0.1 | A | 0/−1 | 30/15 | 10 | 1.09 |
| Example6 | FIG. 1 | 0.5 | 0 | A | None | 90/45 | 2 | 1.09 |
| Example7 | FIG. 1 | — | — | — | None | 90/45 | 2 | 1.06 |
| Example8 | FIG. 1 | 0.5 | 0 | A | 0/−1 | 60/30 | 2 | 1.09 |
| Example9 | FIG. 1 | 0.5 | 0 | A | 0/−1 | 90/45 | 2 | 1.09 |
| Example10 | FIG. 3 | 0.5 | 0 | A | None | 90/45 | 2 | 1.09 |
| Example11 | FIG. 1 | 0.5 | 0 | B | 0/−1 | 60/30 | 2 | 1.09 |
| Comparative example1 | FIG. 1 | — | — | — | 0/−1 | None | — | 1.09 |
| Comparative example2 | FIG. 1 | 0.8 | 0 | A | 0/−1 | 90/45 | 0 | 1.09 |
| Comparative example3 | FIG. 1 | 0.5 | 0 | A | 0/−1 | 90/45 | −2 | 1.09 |
| Comparative example4 | FIG. 1 | — | — | — | 0/−1 | None | — | 1.09 |
| Comparative example5 | FIG. 1 | — | — | — | 0/−1 | None | — | 1.09 |

TABLE 1B

| | Second optical compensation layer | | Tint index | | Light leak index Luminance |
|---|---|---|---|---|---|
| | Retardation film 1 | Retardation film 2 | | | |
| | (Re/Rth) | (Re/Rth) | hab σ | Δu'v' | max |
| Example 1 | 100/100 | 0/−155 | B(55.7) | A(0.096) | A(0.65) |
| Example 2 | 100/100 | 0/−155 | A(43.7) | B(0.106) | A(0.63) |
| Example 3 | 100/100 | 0/−155 | A(45.6) | A(0.096) | A(0.65) |
| Example 4 | 100/100 | 0/−155 | B(65.7) | A(0.087) | A(0.65) |
| Example 5 | 100/100 | 0/−155 | A(31.0) | A(0.084) | B(0.70) |
| Example 6 | 100/100 | 0/−155 | A(46.1) | A(0.085) | A(0.65) |
| Example 7 | 100/100 | 0/−155 | A(46.1) | A(0.083) | B(0.66) |
| Example 8 | 240/5 | — | A(49.4) | C(0.189) | A(0.54) |
| Example 9 | 110/−100 | 0/110 | A(44.0) | C(0.187) | A(0.52) |
| Example 10 | 100/100 | 0/−155 | B(58.8) | B(0.138) | A(0.64) |
| Example 11 | 100/100 | 0/−155 | B(55.7) | A(0.096) | A(0.65) |
| Comparative example 1 | 100/100 | 0/−155 | D(92.5) | A(0.096) | A(0.66) |
| Comparative example 2 | 100/100 | 0/−155 | C(83.8) | B(0.115) | B(0.67) |
| Comparative example 3 | 100/100 | 0/−155 | D(94.6) | B(0.121) | C(0.75) |
| Comparative example 4 | 240/5 | — | B(62.7) | D(0.202) | A(0.60) |
| Comparative example 5 | 110/−100 | 0/110 | B(61.2) | D(0.211) | A(0.58) |

In the table shown above, Re represents in-plane retardation (nm) at a wavelength of 550 nm, and Rth represents retardation (nm) across the thickness at a wavelength of 550 nm. The unit of the tilt angle is "degree." The wavelength dispersion is defined by the ratio of the in-plane retardation at a wavelength of 450 nm to the in-plane retardation at a wavelength of 550 nm.

As in the table shown above, the liquid crystal display device according to the present invention has a small tint index hab σ, a small Δu'v', and a small light leak index. The results demonstrate that the variation in the tint can be reduced while the viewing angle contrast during a black display mode is being maintained.

<Thin Polymer Film>

A dope P10 and a dope T30 having the following compositions were prepared.

Composition of Dope P10:

| | |
|---|---|
| Commercially available Dianal BR88 manufactured by Mitsubishi Rayon Co., Ltd. | 100.0 parts by mass |
| Additive AA1 | 5.8 parts by mass |
| Additive AA2 | 1.8 parts by mass |
| Additive UU1 | 2.0 parts by mass |

Composition of dope T30:

| | |
|---|---|
| Cellulose acylate (degree of substitution: 2.42) | 100.0 parts by mass |
| Additive AA1 | 5.8 parts by mass |
| Additive AA2 | 1.8 parts by mass |
| Additive UU1 | 2.0 parts by mass |

The additive AA1 was a compound represented by the following formula:

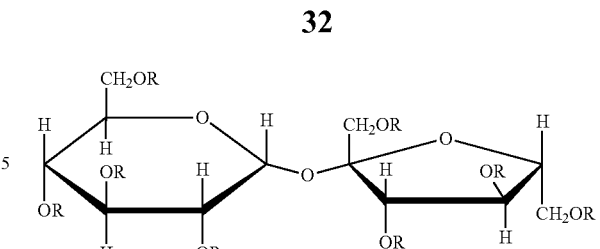

Additive AA1 where R represents a benzoyl group, and the average degree of substitution is 5 to 7.

The additive AA2 was a compound represented by the following formula:

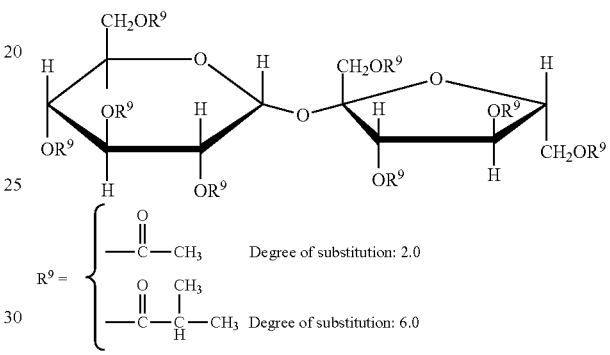

The formulae and degrees of substitution of $R^9$ are shown above.

The additive UU1 was a compound represented by the following formula:

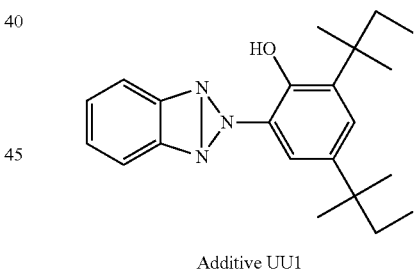

Additive UU1

A laminated film was formed using the dope P10 and the dope T30 through a solution casting method. Specifically, the two dopes were cast onto a metal support through a casting T-die for triple-layer co-casting. A lower layer (T30), an intermediate layer (P10), and an upper layer (T30) were cast in sequence onto the surface of the metal support. The viscosity of each layer was appropriately controlled through the adjustment of the solid content depending on the combination of the dopes so as to enable even casting. Dry air at 40° C. was applied to the dopes cast onto the metal support. The dried film was peeled off and then fixed with pins at both ends. While keeping a constant length between the pins, the film was dried in dry air at 105° C. for five minutes. After the pins were removed, the film was further dried at 130° C. for 20 minutes. The resulting laminated film was reeled.

The triple-layer film was then peeled off. The thickness of the lower sublayer was 20 μm. In this way, a thin polymer film was stably produced.

Two liquid crystal display devices were produced each having the same composition including the thin film instead of the TD80UF, which was used in the preparation of the polarizing plate. The liquid crystal display devices were evaluated as described above, and the results were excellent like the examples described above.

<Thin Polarizing Film>

A thin polarizing film was prepared in accordance with the procedures disclosed in Japanese Patent No. 4804588. Polyethylene terephthalate that was a copolymer of isophthalic acid and 6 mol % of isophthalic acid was prepared as an amorphous ester thermoplastic resin film. A PVA resin layer was applied onto the resin film. The resin film and the PVA resin layer were stretched together in two steps, i.e., pre-stretching in air and stretching in a boric-acid solution, and then the PVA resin layer was dyed with a dichroic dye to prepare a polarizing film having a thickness of 3 μm. The polarizing film was evaluated in the same way as described above, and excellent results were confirmed as in the examples described above.

<Smectic Liquid Crystal>

Liquid crystal display devices in Examples 12 and 13 were produced with first optical compensation films of Example 1, except that the contents of the fluorinated compound A and the fluorinated compound B in the coating solution A for a retardation layer were varied as shown in Table 2. The first optical compensation films of Examples 14 to 17 were produced as in Example 1 except that the coating solution B for a retardation layer was used in place of the coating solution A and the contents of the fluorinated compound A and the fluorinated compound B were varied as shown in Table 2.

Composition of Coating Solution B for Retardation Layer

| | |
|---|---|
| Rod-like liquid crystal compound A | 81 parts by mass |
| Compound B | 18 parts by mass |
| Photopolymerization Initiator | 3.0 parts by mass |
| (Irgacure 907 manufactured by Chiba Specialty Chemicals Corporation) | |
| Sensitizer (Kayacure-DETX manufactured by Nippon Kayaku Co., Ltd.) | 1.0 parts by mass |
| Fluorinated compound A | 0.6 parts by mass |
| Fluorinated compound B | 0.1 parts by mass |
| Methyl ethyl ketone | 0.7 parts by mass |
| Chloroform | 400 parts by mass |

Rod-like liquid crystal compound A

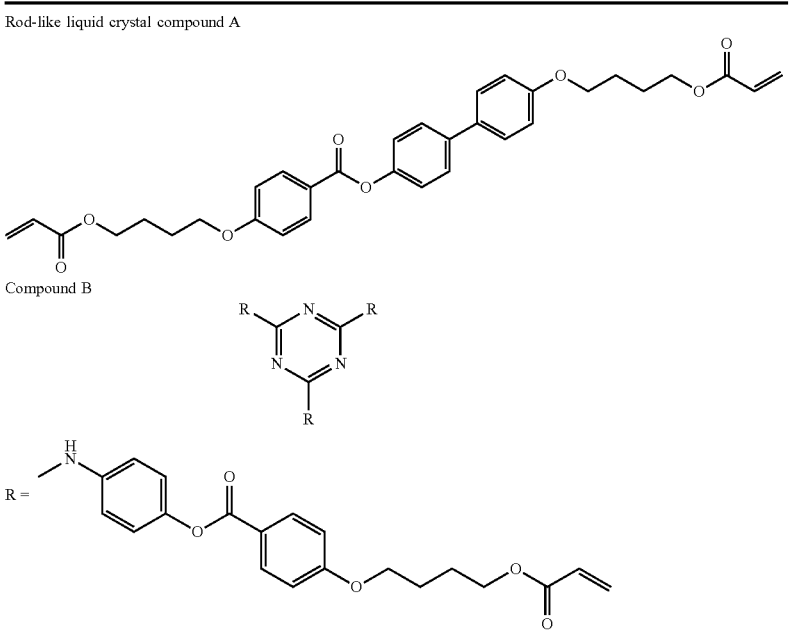

Compound B

<Evaluation>

<<Front Contrast>>

The luminance of the black display mode (L0) and the white display mode (L7) were measured with a measuring device (BM-5A manufactured by Topcon Corporation) to determine the front contrast (L7/L0). The results were evaluated by the following three criteria:

A: 900 or more

B: 750 or more to less than 900

C: less than 750

<<Measurement of Orientation Axis Distribution>>

The optical compensation sheet having a liquid crystal layer was rotated on a stage in a 0.5-degree increment at a magnification of 400 using a polarizing microscope having a cross Nicol polarizing plate to find a stage angle providing the darkest image. Images of the optical compensation sheet were acquired with a digital camera within the range of ±10 degrees from the angle providing the darkest image. The images acquired with a digital camera were rotated and translated so that the pixels of the images coincide with each other. The angle providing the darkest value was recorded for each pixel to prepare a histogram having a horizontal axis representing the angle and a vertical axis representing the number of darkest pixels at the corresponding angle, and then the half-width was determined.

The polarizing microscope was Eclipse E600 POL manufactured by Nikon Corporation. The rotation and translation of the images can be performed with a commercially available program.

<<Film Contrast>>

A fluorescent-tube direct backlight source, an upper polarizing plate, a sample, and a lower polarizing plate were stacked on a table in sequence such that their surfaces were disposed horizontally. The sample and the polarizing plate were rotatable. Using the light emerging from the light source and passing through the upper polarizing plate, the sample, the lower polarizing plate, in sequence, the luminance was measured in the vertical direction with the device BM-5A (manufactured by Topcon Corporation). The upper polarizing plate was rotated without providing the sample and measured to find the position that had the lowest luminance (in a cross Nicol state). The sample was then placed on the upper polarizing plate and rotated and measured in the cross Nicol state to find the lowest luminance. Subsequently, the upper polarizing plate and the lower polarizing plate were arranged in parallel Nicol positions. The sample was then rotated and measured to find the highest luminance (luminance max). The film contrast was determined by the following expression: (maximum luminance in parallel Nicol state)/(minimum luminance in cross Nicol state).

The present disclosure relates to the subject matter contained in Japanese Patent Application No. 071287/2013, filed on Mar. 29, 2013, Japanese Patent Application No. 129109/2013, filed on Jun. 20, 2013, and Japanese Patent Application No. 138434/2013, filed on Jul. 1, 2013 which are expressly incorporated herein by reference in their entirety. All the publications referred to in the present specification are also expressly incorporated herein by reference in their entirety.

The foregoing description of preferred embodiments of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention not be limited by the specification, but be defined claims set forth below.

The invention claimed is:

1. A liquid crystal display comprising, in sequence:
a first polarizer;
a liquid crystal cell including a liquid crystal layer containing liquid crystal molecules horizontally aligned to a face of a substrate of the liquid crystal cell; and

TABLE 2A

| | First optical compensation layer | | | | | | |
|---|---|---|---|---|---|---|---|
| | Coating solution for a retardation layer | Fluorinated compound A | Fluorinated compound B | Support (Re/Rth) | Retardation film (Re/Rth) | Tilt angle | Half-width of the orientation distribution | Film contrast value |
| Example12 | A | 0.6 | 0.1 | 0/−1 | 60/30 | 2 | 0.71 | 3000 |
| Example13 | A | 0.6 | 0 | 0/−1 | 200/100 | 1 | 0.71 | 1000 |
| Example14 | B | 0.6 | 0.1 | 0/−1 | 60/30 | 2 | 0.16 | 10000 |
| Example15 | B | 0.6 | 0.1 | 0/−1 | 60/30 | 2 | 0.16 | 10000 |
| Example16 | B | 0.6 | 0.1 | 0/−1 | 90/45 | 2 | 0.16 | 9500 |
| Example17 | B | 0.6 | 0 | 0/−1 | 200/100 | 1 | 0.16 | 8000 |

TABLE 2B

| | Second optical compensation layer | | Light leak | | | |
|---|---|---|---|---|---|---|
| | Retardation film 1 | Retardation film 2 | Tint index hab σ | Δ u'v' | index Luminance max | Front contrast |
| Example12 | 100/100 | 0/−155 | B(55.7) | A(0.096) | A(0.65) | B(750) |
| Example13 | 100/100 | 0/−155 | B(60.9) | B(0.134) | A(0.63) | C(500) |
| Example14 | 100/100 | 0/−155 | B(55.7) | A(0.096) | A(0.65) | A(910) |
| Example15 | 240/5 | — | A(49.4) | C(0.189) | A(0.54) | A(910) |
| Example16 | 110/−100 | 0/110 | A(44.0) | C(0.187) | A(0.52) | A(905) |
| Example17 | 100/100 | 0/−155 | B(60.9) | B(0.134) | A(0.63) | B(890) |

The Column for Retardation film 1 and Retardation film 2 shows Rth/Re.

A comparison between Examples 12, 14, and 15 and a comparison between Examples 13 and 17 indicated that the examples having a high front contrast had a first optical compensation film having a high film contrast value and a high orientation distribution half-width. The film contrast value was proportional to the dispersion and the content of depolarization component, and the orientation distribution half-width was proportional to the degree of alignment order of the liquid crystal molecules. Thus, the high front contrast was achieved through the alleviation of the dispersion and the reduction in the depolarization component by the liquid crystal molecules aligned with a high degree of order.

a second polarizer;
the liquid crystal display further comprising a first optical compensation film disposed between the first polarizer and the liquid crystal cell or between the liquid crystal cell and the second polarizer,
an absorption axis of the first polarizer, an optical axis of the first optical compensation film, and an optical axis of the liquid crystal layer of the liquid crystal cell being parallel to each other in a view of the liquid crystal cell in a direction orthogonal to the face of the substrate of the liquid crystal cell,
the optical axis of the liquid crystal layer of the liquid crystal cell and the optical axis of the first optical compensation film having a tilt angle from the face of the substrate of the liquid crystal cell in a same direction, and the first optical compensation film having positive birefringence;

the liquid crystal display further comprising:

a second optical compensation film in the second polarizer at the side of the liquid crystal cell, wherein the second optical compensation film satisfies:

$$0\ nm<|Re(550)|\leq 550\ nm,$$

where $|Re(550)|$ represents an absolute value of the in-plane retardation at a wavelength of 550 nm, and wherein the second optical compensation film satisfies:

$$150\ nm\leq Re(550)\leq 300\ nm;$$

and $$-100\ nm\leq Rth(550)\leq 100\ nm,$$

where $Re(550)$ represents in-plane retardation (nm) at a wavelength of 550 nm, and $Rth(550)$ represents retardation (nm) across the thickness at a wavelength of 550 nm.

2. A liquid crystal display comprising, in sequence:

a first polarizer;

a liquid crystal cell including a liquid crystal layer containing liquid crystal molecules horizontally aligned to a face of a substrate of the liquid crystal cell; and a second polarizer;

the liquid crystal display further comprising a first optical compensation film disposed between the first polarizer and the liquid crystal cell or between the liquid crystal cell and the second polarizer, an absorption axis of the first polarizer, an optical axis of the first optical compensation film, and an optical axis of the liquid crystal layer of the liquid crystal cell being parallel to each other in a view of the liquid crystal cell in a direction orthogonal to the face of the substrate of the liquid crystal cell, the optical axis of the liquid crystal layer of the liquid crystal cell and the optical axis of the first optical compensation film having a tilt angle from the face of the substrate of the liquid crystal cell in a same direction, and the first optical compensation film having positive birefringence;

the liquid crystal display further comprising:

a second optical compensation film in the second polarizer at the side of the liquid crystal cell, wherein the second optical compensation film satisfies:

$$0\ nm<|Re(550)|\leq 550\ nm,$$

where $|Re(550)|$ represents an absolute value of the in-plane retardation at a wavelength of 550 nm, wherein the second optical compensation film comprises two layers, and wherein, one layer in the second optical compensation film satisfies:

$$-100\ nm\leq Re(550)\leq 100\ nm;$$

and $$-250\ nm\leq Rth(550)\leq 0\ nm,$$

and other one layer in the second optical compensation film satisfies:

$$0\ nm\leq Re(550)\leq 200\ nm;$$

and $$0\ nm\leq Rth(550)\leq 200\ nm,$$

where $Re(550)$ represents in-plane retardation (nm) at a wavelength of 550 nm, and $Rth(550)$ represents retardation (nm) across the thickness at a wavelength of 550 nm.

3. The liquid crystal display according to claim 2, wherein, one layer in the second optical compensation film satisfies:

$$-50\ nm\leq Re(550)\leq 50\ nm;$$

and $$-200\ nm\leq Rth(550)\leq -100\ nm,$$

and other one layer in the second optical compensation film satisfies:

$$50\ nm\leq Re(550)\leq 150\ nm;$$

and $$50\ nm\leq Rth(550)\leq 150\ nm,$$

where $Re(550)$ represents in-plane retardation (nm) at a wavelength of 550 nm, and $Rth(550)$ represents retardation (nm) across the thickness at a wavelength of 550 nm.

4. A liquid crystal display comprising, in sequence:

a first polarizer;

a liquid crystal cell including a liquid crystal layer containing liquid crystal molecules horizontally aligned to a face of a substrate of the liquid crystal cell; and a second polarizer;

the liquid crystal display further comprising a first optical compensation film disposed between the first polarizer and the liquid crystal cell or between the liquid crystal cell and the second polarizer, an absorption axis of the first polarizer, an optical axis of the first optical compensation film, and an optical axis of the liquid crystal layer of the liquid crystal cell being parallel to each other in a view of the liquid crystal cell in a direction orthogonal to the face of the substrate of the liquid crystal cell, the optical axis of the liquid crystal layer of the liquid crystal cell and the optical axis of the first optical compensation film having a tilt angle from the face of the substrate of the liquid crystal cell in a same direction, and the first optical compensation film having positive birefringence;

the liquid crystal display further comprising:

a second optical compensation film in the second polarizer at the side of the liquid crystal cell, wherein the second optical compensation film satisfies:

$$0\ nm<|Re(550)|\leq 550\ nm,$$

where |Re(550)| represents an absolute value of the in-plane retardation at a wavelength of 550 nm, wherein the second optical compensation film comprises two layers, and wherein, one layer in the second optical compensation film satisfies:

−50 nm≤Re(550)≤50 nm;

and 50 nm≤Rth(550)≤200 nm, and other one layer of the second optical compensation film satisfies:

50 nm≤Re(550)≤150 nm;

and

−150 nm≤Rth(550)≤−50 nm, where Re(550) represents in-plane retardation (nm) at a wavelength of 550 nm, and Rth(550) represents retardation (nm) across the thickness at a wavelength of 550 nm.

5. A liquid crystal display comprising, in sequence:
a first polarizer;
a liquid crystal cell including a liquid crystal layer containing liquid crystal molecules horizontally aligned to a face of a substrate of the liquid crystal cell; and
a second polarizer;
the liquid crystal display further comprising a first optical compensation film disposed between the first polarizer and the liquid crystal cell or between the liquid crystal cell and the second polarizer,
an absorption axis of the first polarizer, an optical axis of the first optical compensation film, and an optical axis of the liquid crystal layer of the liquid crystal cell being parallel to each other in a view of the liquid crystal cell in a direction orthogonal to the face of the substrate of the liquid crystal cell,
the optical axis of the liquid crystal layer of the liquid crystal cell and the optical axis of the first optical compensation film having a tilt angle from the face of the substrate of the liquid crystal cell in a same direction, and
the first optical compensation film having positive birefringence,
wherein the first optical compensation film satisfies:

Re(450)/Re(550)≤1.2;

and

Rth(450)/Rth(550)≤1.2, where Re(450) represents in-plane retardation (nm) at a wavelength of 450 nm, Re(550) represents in-plane retardation (nm) at a wavelength of 550 nm, Rth(450) represents retardation (nm) across the thickness at a wavelength of 450 nm, and Rth(550) represents retardation (nm) across the thickness at a wavelength of 550 nm.

6. The liquid crystal display according to claim 5, wherein the first optical compensation film is disposed between the first polarizer and the liquid crystal cell.

7. The liquid crystal display according to claim 5, wherein the first optical compensation film is disposed between the liquid crystal cell and the second polarizer.

8. The liquid crystal display according to claim 5, wherein the optical axis of the first optical compensation film has a tilt angle of 1 to 20 degrees relative to the face of the substrate of the liquid crystal cell by an angle.

9. The liquid crystal display according to claim 5, wherein an in-plane retardation (nm) Re(550) at a wavelength of 550 nm of the first optical compensation film is in a range of 20 to 300 nm and an Nz value (Nz=Rth(550)/Re(550)+0.5) is in a range of 0.9 to 1.1, where Re(550) represents in-plane retardation (nm) at a wavelength of 550 nm, and Rth(550) represents retardation (nm) across the thickness at a wavelength of 550 nm.

10. The liquid crystal display according to claim 5, further comprising:
a second optical compensation film in the second polarizer at the side of the liquid crystal cell.

11. The liquid crystal display according to claim 10, wherein the second optical compensation film satisfies:

0 nm<|Re(550)|≤550 nm, where |Re(550)| represents an absolute value of the in-plane retardation at a wavelength of 550 nm.

12. The liquid crystal display according to claim 11, wherein the second optical compensation film comprises two layers.

13. The liquid crystal display according to claim 12, wherein, one layer in the second optical compensation film satisfies:

−100 nm≤Re(550)≤100 nm;

and 0 nm≤Rth(550)≤250 nm, and other one layer of the second optical compensation film satisfies:

0 nm≤Re(550)≤200 nm;

and

−200 nm≤Rth(550)≤0 nm, where Re(550) represents in-plane retardation (nm) at a wavelength of 550 nm, and Rth(550) represents retardation (nm) across the thickness at a wavelength of 550 nm.

14. The liquid crystal display according to claim 5, wherein the first optical compensation film satisfies:

Re(450)/Re(550)≤0.9;

and

Rth(450)/Rth(550)≤0.9 where Re(450) represents in-plane retardation (nm) at a wavelength of 450 nm, Re(550) represents in-plane retardation (nm) at a wavelength of 550 nm, Rth(450) represents retardation (nm) across the thickness at a wavelength of 450 nm, and Rth(550) represents retardation (nm) across the thickness at a wavelength of 550 nm.

15. The liquid crystal display according to claim 10, wherein at least one of the first optical compensation film and the second optical compensation film comprises a polymer film.

16. The liquid crystal display according to claim 15, wherein the polymer film is selected from a cellulose acylate film, a cyclic olefin polymer film, or an acrylic polymer film.

17. The liquid crystal display according to claim 15,
wherein the polymer film has a thickness in a range of 1 to 90 μm.

18. The liquid crystal display according to claim 16,
wherein the acrylic polymer film contains at least one of a lactone cyclic unit, a maleic anhydride unit, and a glutaric anhydride unit.

19. The liquid crystal display according to claim 5, wherein at least one of the first polarizer and the second polarizer is disposed between an optical compensation film and a polarizer protective film.

20. The liquid crystal display according to claim 19, wherein the polarizer protective film has a thickness in a range of 10 to 80 μm.

21. The liquid crystal display according to claim 10,
wherein the first polarizer or the second polarizer has a thickness of 50 μm or less.

22. The liquid crystal display according to claim 10, wherein at least one of the first optical compensation film and the second optical compensation film comprises a film prepared by fixing the alignment state of the constituents of the liquid crystal.

23. The liquid crystal display according to claim 5, wherein the first optical compensation film comprises a film prepared by fixing the alignment state of the liquid crystal composition.

24. The liquid crystal display according to claim 22, wherein at least one of the first optical compensation film and the second optical compensation film is adjacent to the first polarizer or the second polarizer at a side of the film prepared by fixing the alignment state of the liquid crystal composition.

25. The liquid crystal display according to claim 22, wherein the liquid crystal compositions shows smectic phase.

26. The liquid crystal display according to claim 5, wherein the first optical compensation film comprises a structural birefringence layer disposed on a face of the first polarizer or the second polarizer.

* * * * *